(12) United States Patent
Hoang et al.

(10) Patent No.: US 6,807,588 B2
(45) Date of Patent: Oct. 19, 2004

(54) METHOD AND APPARATUS FOR MAINTAINING ORDER IN A QUEUE BY COMBINING ENTRY WEIGHTS AND QUEUE WEIGHTS

(75) Inventors: Tri M. Hoang, Poughkeepsie, NY (US); Tracy D. Butler, Wappingers Falls, NY (US); Danny R. Sutherland, Poughkeepsie, NY (US); David B. Emmes, Wappingers Falls, NY (US); Mariama Ndoye, Poughkeepsie, NY (US); Elpida Tzortzatos, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 10/085,576

(22) Filed: Feb. 27, 2002

(65) Prior Publication Data

US 2003/0163644 A1 Aug. 28, 2003

(51) Int. Cl.[7] .................................................. G06F 13/18
(52) U.S. Cl. ............................. 710/39; 710/40; 710/41; 710/42; 710/43; 710/44; 710/54; 370/395.42; 370/395.4; 711/136; 711/160
(58) Field of Search ...................... 370/395.42, 395.41, 370/395.43, 395.4; 710/39, 40, 41, 42, 43, 44, 54; 711/136, 160, 129, 153, 170, 173

(56) References Cited

U.S. PATENT DOCUMENTS

| | | | | |
|---|---|---|---|---|
| 5,231,633 A | * | 7/1993 | Hluchyj et al. | 370/429 |
| 5,325,504 A | * | 6/1994 | Tipley et al. | 711/128 |
| 5,353,425 A | * | 10/1994 | Malamy et al. | 711/144 |
| 5,668,972 A | * | 9/1997 | Liu et al. | 711/136 |
| 5,778,432 A | * | 7/1998 | Rubin et al. | 711/135 |
| 5,923,656 A | * | 7/1999 | Duan et al. | 370/395 |
| 5,959,993 A | * | 9/1999 | Varma et al. | 370/397 |
| 6,470,016 B1 | * | 10/2002 | Kalkunte et al. | 370/395.41 |
| 6,480,911 B1 | * | 11/2002 | Lu | 710/54 |

FOREIGN PATENT DOCUMENTS

JP      2000165386 A    *   6/2000

OTHER PUBLICATIONS

ABCs of OS/390 System Programming, vol. 1, P. Rogers et al., Apr. 2000, SG24–5597–00, pp. 43–71.
OS/390 Version 2 Release 10 Implementation, P. Rogers et al., Mar. 2001, SG24–5976–00, pp. 9–34.

* cited by examiner

Primary Examiner—B. James Peikari
(74) Attorney, Agent, or Firm—William A. Kinnaman, Jr.

(57) ABSTRACT

A sectioned ordered queue in an information handling system comprises a plurality of queue sections arranged in order from a first queue section to a last queue section. Each queue section contains one or more queue entries that correspond to available ranges of real storage locations and are arranged in order from a first queue entry to a last queue entry. Each queue section and each queue entry in the queue sections having a weight factor defined for it. Each queue entry has an effective weight factor formed by combining the weight factor defined for the queue section with the weight factor defined for the queue entry. A new entry is added to the last queue section to indicate a newly available corresponding storage location, and one or more queue entries are deleted from the first section of the queue to indicate that the corresponding storage locations are no longer available. Various processes associated with a real storage manager are responsible for keeping the queue sections in balance, updating the queue sections, and removing entries from the queue to "steal" real storage frames.

40 Claims, 22 Drawing Sheets

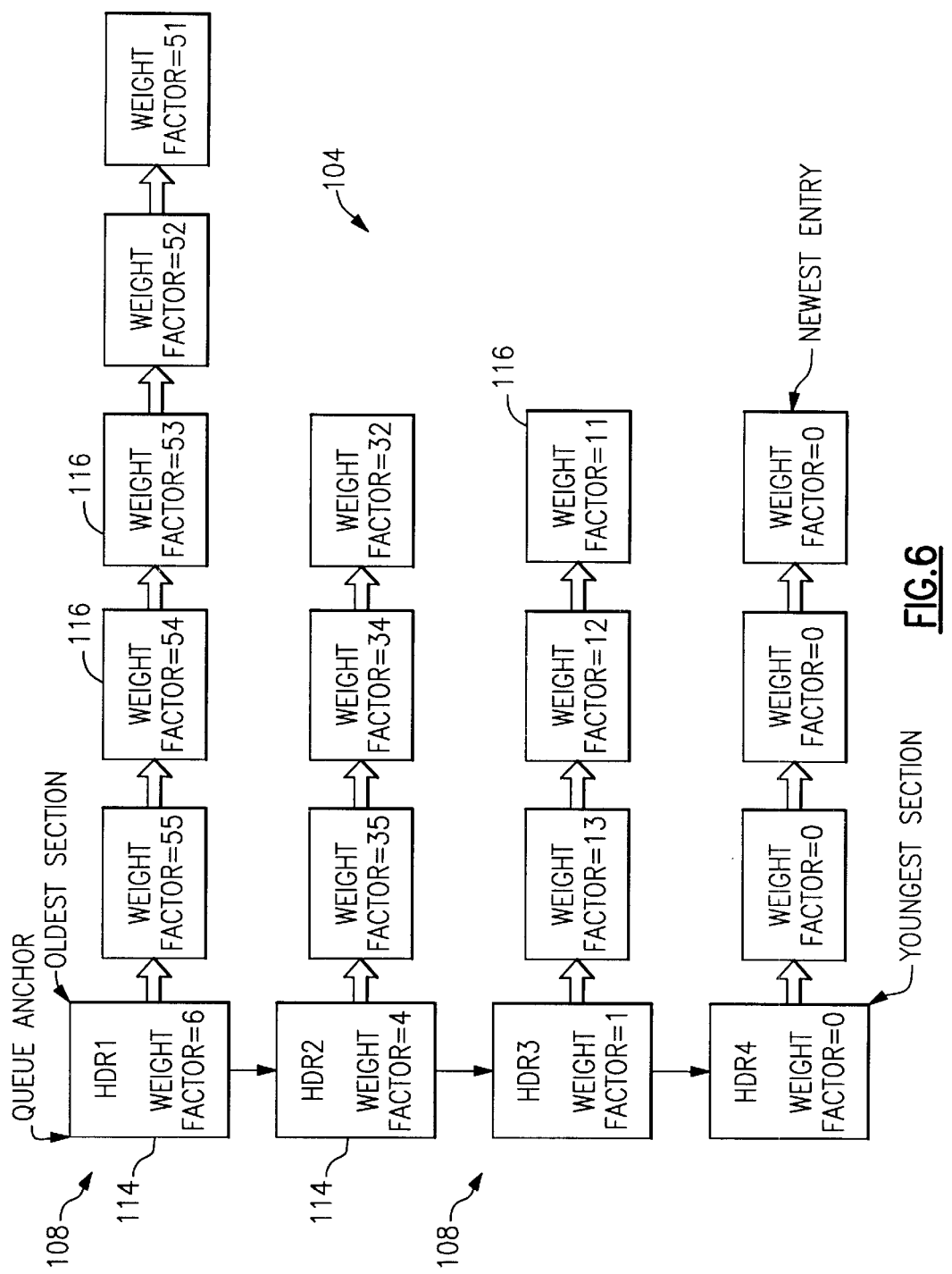

METHOD AND APPARATUS FOR MAINTAINING ORDER IN A QUEUE BY COMBINING ENTRY WEIGHTS AND QUEUE WEIGHTS

BACKGROUND OF THE INVENTION

1. Field of the Invention

The present invention relates generally to a method for an operating system to build and maintain sectioned, ordered queues to achieve a reduction in operating costs when traversing these queues and manipulating their queue entries. More particularly, the present invention relates to a more efficient method for an operating system to recover real storage from an address space for potential use in another address space. In this application, the queues that represent the real storage in use by an address space are very long queues.

2. Description of the Related Art

Typically, in operating systems that support multiple virtual address spaces and that have the ability to support more virtual addresses (hereinafter referred to as pages) than can be backed simultaneously by real storage addresses (hereinafter referred to as frames), it is sometimes necessary to reallocate the use of a frame to a different address space. This technique is called paging and allows the operating system to reclaim a subset of the resources of one address space and use that subset for immediate operations in another address space. When the system needs to reference or update a page, a frame is obtained and the dynamic address translation tables for that page are updated using a process called 'backing', which indicates that real memory is associated with that page.

This process is described for the IBM OS/390 operating system in such publications as the IBM Redbooks *ABCs of OS/390 System Programming Volume* 1, SG24-5597-00, pages 43–71 (April 2000), and *OS/390 Version 2 Release 10 Implementation*, SG24-5976-00, pages 9–34 (March 2001), both of which are incorporated herein by reference. Referring to FIG. 1, when an instance 10 of the OS/390 operating system (OS) needs frames to back a virtual storage request, it goes to a queue 12 of available frames 14 to satisfy the request. A system resource manager (SRM) 18 checks periodically to ensure that there are a reasonable number of frames on this queue 12 for this purpose. OS instance 10 maintains an in-use frame queue 12 for each separate address space 16. If the SRM 18 detects a shortage, it uses a least recently used (LRU) algorithm to determine which in-use frames in the system are the best candidates to be reclaimed in order to replenish the supply of available frames. (Using this algorithm, frames that have not recently been referenced are the best candidates to be reclaimed.) This process for reclaiming frames is hereinafter referred to as stealing.

A real storage manager (RSM) 20 identifies how recently a frame has been referenced by maintaining an unreferenced interval count (UIC) value for each frame in use by an address space. 16 In order for the system to more quickly identify which frames are the best candidates to steal, the real storage manager (RSM) 20 maintains the address space frame queues in UIC order, with the least recently referenced frames at the beginning of the queue 12. Periodically, the RSM 20 performs update processing, which determines whether frames have been referenced, and if so, moves them to the end of the frame queue 12. Upon completion of the update processing, the least recently referenced frames remain at the beginning of the queue 12 with their UIC values incremented by a constant value and the most recently referenced frames are at the end of the frame queue 12 with their UIC values reset to zero.

The SRM 18 selects the targeted address spaces 16 to steal from, and also indicates a minimum UIC value which a frame to be stolen from any targeted frame queue 12 can have. The SRM 18 also specifies the total number of frames required to satisfy the steal request. The RSM steal processing then attempts to satisfy the SRM's request by traversing the indicated address spaces' frame queues and selecting the frames that meet the SRM's UIC steal criteria. The RSM steal processing also makes one last check to determine whether or not a frame has been recently referenced, and, like the RSM UIC update process, moves any referenced frames to the end of the frame queue 12 with their UIC values reset to zero. If the RSM steal process is unable to fully satisfy the SRM's request, the SRM 18 may elect to create a new steal request with different parameters, and this process may repeat itself until the system's needs for frames is satisfied.

With new advances in hardware design, a larger virtual storage area is made available to address spaces 16 in an operating system. The typical approach of keeping the frame queues associated with an address space 16 in a linear structure may cause system performance degradation when traversing the queues. In a multitasking environment, processing such a queue 12 requires resource serialization which may prevent other processes from being dispatched or may even cause abnormal task termination if the processing of the longer queue 12 exceeds the system's specified time-out intervals. The RSM UIC update and RSM UIC steal processes may no longer perform their functions effectively when traversing or manipulating the frame queues which represent this larger virtual storage area.

SUMMARY OF THE INVENTION

In general, the present invention contemplates a method and apparatus for maintaining a queue in an information handling system, in which there are defined a plurality of queue sections arranged in order from a first queue section to a last queue section. Each of the queue sections contains one or more queue entries arranged in order from a first queue entry to a last queue entry. A weight factor is defined for each queue section and for each queue entry in the queue sections. Each of the queue entries has an effective weight factor formed by combining the weight factor defined for the queue section with the weight factor defined for the queue entry.

The queue entries may correspond to available storage locations, in particular ranges of real storage addresses. The effective weight factor for such a queue entry represents an amount of time the storage location corresponding to the entry has not been referenced.

A new entry is added to the last queue section to indicate a newly available corresponding storage location, while one or more queue entries having at least a predetermined effective weight factor and corresponding to storage locations that have not been referenced in a previous time interval are deleted from the first queue section to indicate that the corresponding storage locations are no longer available.

Periodically, the effective weight factors of the queue entries are updated in accordance with whether the corresponding storage locations have been referenced. This is done by incrementing the effective weight factors of queue entries corresponding to storage locations that have not been referenced in a previous time interval and resetting the effective weight factors of queue entries corresponding to storage locations that have been referenced in a previous time interval. During such updating, the queue entries are maintained in the sections in order of their effective weight factors. Preferably, the individual weight factor defined for each queue entry in the first queue section is updated in accordance with whether the corresponding storage location has been referenced, while only the weight factor defined for each remaining queue section is updated without updating the individual weight factor defined for each queue entry in such remaining queue section. Each queue entry in the first queue section corresponding to a referenced storage location is moved to another section.

Preferably, the number of queue entries in each of the queue sections is maintained within a predetermined permissible range defined for the queue sections, by moving queue entries between queue sections and creating or deleting sections as needed. The weight factors defined for the moved queue entries are adjusted so that their effective weight factors in the new queue section are the same as their effective weight factors in the old queue section.

In a computing system having address spaces using large amount of virtual storage, the number of entries on the system resource queues used to maintain and control the amount of virtual storage, namely the real storage frame queues, becomes proportionally larger. The operating costs of maintaining order of the queue entries, traversing the queue and manipulating queue entries can be reduced by organizing the long queue into sections of fixed maximum and minimum number of entries and assigning a weight factor to each of the sections as well as individual queue entries. The sections are ordered by their weight factors and queue manipulation processing can be performed on a section by section basis determined by the section's weight factor. This queue structure is hereinafter referred to as a sectioned ordered queue.

A weight factor update process is defined to ensure queue elements and their sections are ordered by their weight factors, which represent the length of time that the entries remain on the queue. Using a least recently used (LRU) algorithm, the process periodically increases the weight factors of the entries that have not been recently referenced. Over time, the longer a queue entry has not been referenced, the higher its weight factor value is. The weight factor provides a simple way to determine how long an entry has been on the queue without being referenced. The entries are then ordered in descending order of their weight factor values so that entries with highest weight factor values are on the oldest section of the queue. This process also ensures that the oldest section of the queue contains at least the minimum allowable number of entries. Such sections are prime candidates for other queue manipulation processes available in the computing system. The weight factor update process is initiated by the system resource manager at fixed intervals throughout the course of system operation.

There are times when the system resource manager needs to steal back some of the queue entries that have not been referenced to be reused. A queue entry steal process is defined to examine the queues in selected address spaces in the computing system. Since the queue entries had been kept in descending order of their weight factor values by the weight factor update process, the entry steal process only needs to look at the first section of the queue to find entries that had not been recently referenced, thus they are good candidates for stealing. Since the oldest sections of the queues are already containing the maximum number of entries, the entry steal process is more likely to find enough entries for stealing from these sections without having to traverse through all sections of the queues.

Another process that is also an integral part of maintaining a sectioned ordered queue is the process of merging two sections of the queue. The merging process can be initiated any time by any other processes in the computing system. The process examines pairs of adjacent queue sections from the youngest section to the oldest section. When a pair of sections can be merged without exceeding the maximum number of allowable entries, the entries from the smaller section are moved to the longer section. The weight factors of the entries being moved are then adjusted so that their effective weight factors in relation to their new section remain the same as their effective weight factors on the original queue section.

The structure of the sectioned ordered queue and previously described queue manipulation processes can be used to implement various data structures in a computing system. One such structure is the priority dispatching queue, where processes are put on the queue waiting to be dispatched based on their times spent on the queue, or their ages. The weight factors for entries of such queue is the ages of the entries on the queue.

BRIEF DESCRIPTION OF THE DRAWINGS

FIGS. 6, 7 and 8 show the addition of a queue entry in a second implementation of the present invention.

DETAILED DESCRIPTION OF THE INVENTION

Figure 2:
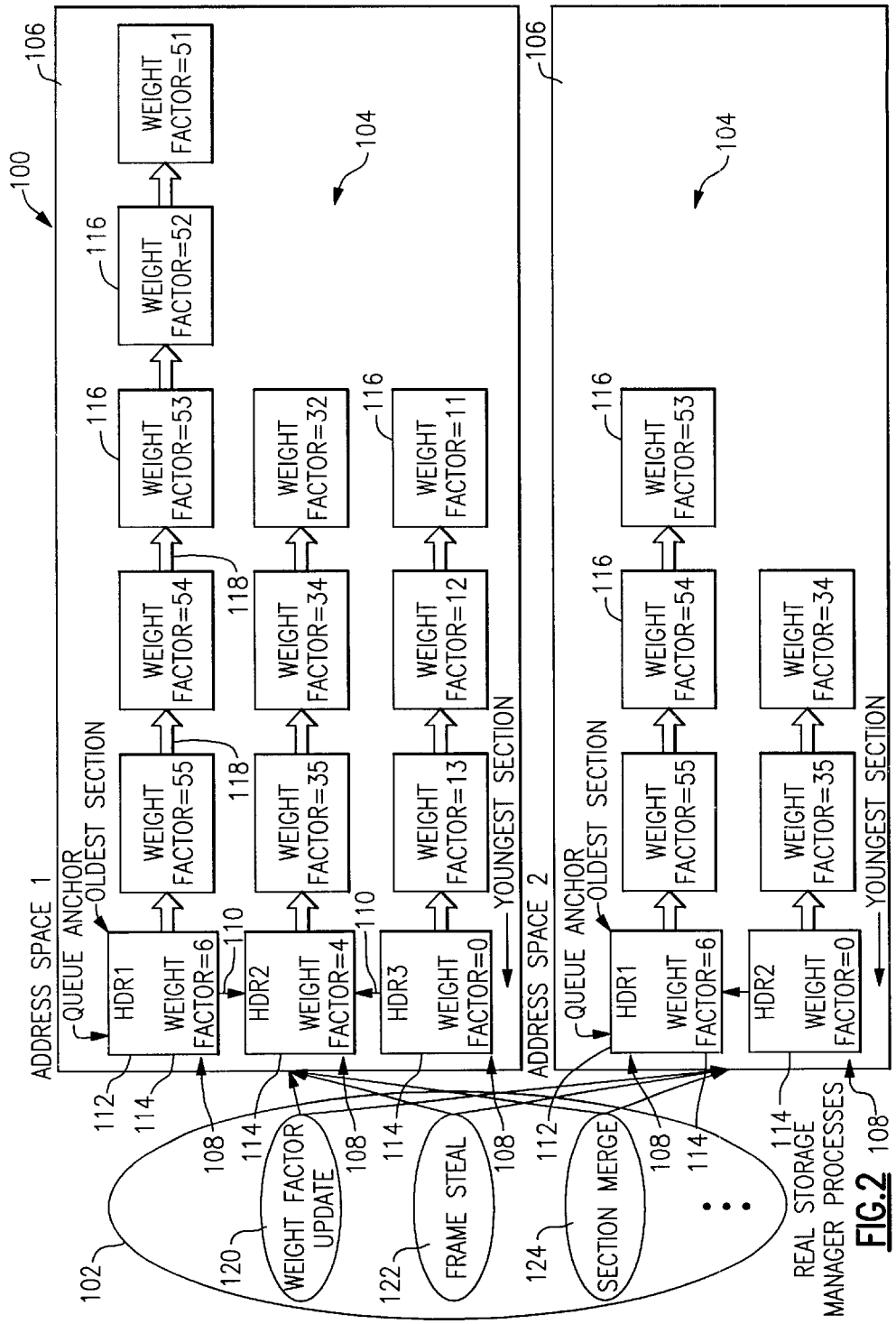
FIG. 2 shows the real storage manager (RSM) processes and their interactions with the queues of the present invention.

FIG. 2 shows the basic elements of a computer system 100 incorporating the present invention. As shown in the figure, system 100 includes a real storage manager (RSM) 102 that maintains a set of sectioned ordered queues 104, one for each address space 106 of the system 100. Each queue 104 contains a plurality of sections 108 arranged in order (through suitable pointers 110) between an oldest (as defined below) section 108 and a youngest, or newest (as defined below), section 108, as determined by their distance from a queue anchor 112. Each section 108 in turn contains a section header 114 and one or more queue entries or elements 116 that are similarly arranged in order (through suitable pointers 118) between an oldest entry 116 and a youngest, or newest, entry 116, as determined by their distance from the queue header 114. The header 114 of the oldest section 108 serves as the queue anchor 112.

As indicated above, as used herein to refer to queue sections 108, the terms "oldest", "youngest", "newest", "first", "last" and the like refer to the location in the chain of headers 114. The "first" or "oldest" queue section 108 is thus the queue section 108 whose header 114 serves as the queue anchor 112, while the "youngest", "newest" or "last" queue section is the queue section 108 whose header 114 is the most distant from the queue anchor 112. Although queue sections 108 nearer to the queue anchor 112 are generally created earlier in time, this is not always the case, as will be evident from the examples below.

As described in the background portion above, each entry 116 of a queue corresponds to a frame of real storage addresses (typically 4,096 bytes) assigned by the system 100 to the particular address space 106 for which the queue 104 is maintained. Each queue entry 116 has an effective weight factor corresponding to an unreferenced interval count (UIC) representing the length of time that the entry has been in the queue—i.e., the length of time the corresponding real storage frame has been assigned to the corresponding address space 106.

Periodically, the effective weight factor for each queue entry 116 is updated—specifically, incremented—to reflect the additional length of time the entry 116 has spent in its queue 104. In accordance with the present invention, the effective weight factor for a queue entry is obtained by combining—i.e., adding together—a section weight factor, defined for the queue section 108 as a whole, and an entry weight factor defined for the particular queue entry 116. By encoding the effective weight factor for queue entries 116 in this manner, one is able to dramatically increase the update speed, since only the queue section headers 108 have to be updated.

RSM 102 contains a number of processes for managing the queues 104, including a weight factor update process 120, a frame steal process 122, and a section merge process 124. Update process 120 is periodically invoked to update the weight factor of each queue entry 116 currently in a queue 104 by updating the weight factors of each of the queue sections 108. Steal process 122 is invoked wherever it is deemed necessary to "steal" a real storage frame from one address space 106 to assign to another address space 106 having a greater need for the frame. Finally, merge process 124 is invoked as needed to move queue entries 116 between different sections 108.

QUEUE BALANCING

To ensure satisfactory results from queue manipulation processing, it is important to maintain a consistent and reasonable number of elements 116 on each section 108 of the queue 104. This technique is hereinafter referred to as the queue balancing process. Two possible implementations of this are disclosed.

1. First Implementation

A first implementation does not maintain the queue 104 with adequately populated sections 108 at all times. Rather, to reduce processing time and hence increase system performance, it ensures that the queue sections 108 contain a reasonable number of entries 116 between a maximum and minimum allowable values. The process of maintaining queue section entries 116 does not take place immediately after each enqueue or dequeue request for a single queue entry 116 but is initiated after a queue manipulation that expects to affect a large number of queue entries 116.

A. Adding Entries

Figure 3:
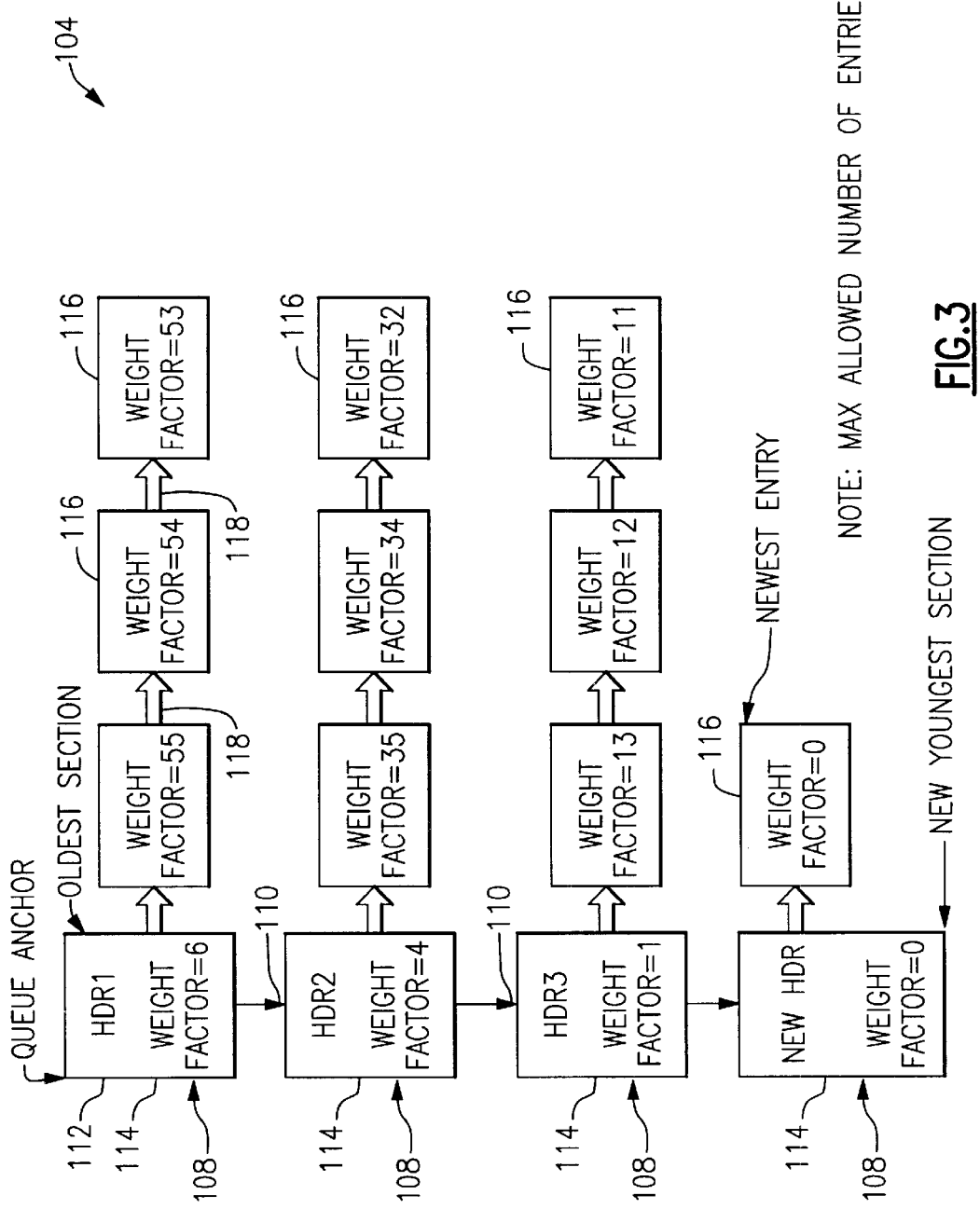
FIG. 3 shows the addition of a queue entry in a first implementation of the present invention.

In this implementation, when a new entry 116 is to be put on the queue 104, it is always assigned a lowest weight factor value and put at the end of the queue 104. If the last section 108, hence youngest section 108, currently contains the maximum number of entries 116, a header 114 for a new youngest section 108 is created to contain the new entry 116. The rest of the queue sections 108 and their entries 116 are not affected during this process (FIG. 3).

Figure 15:
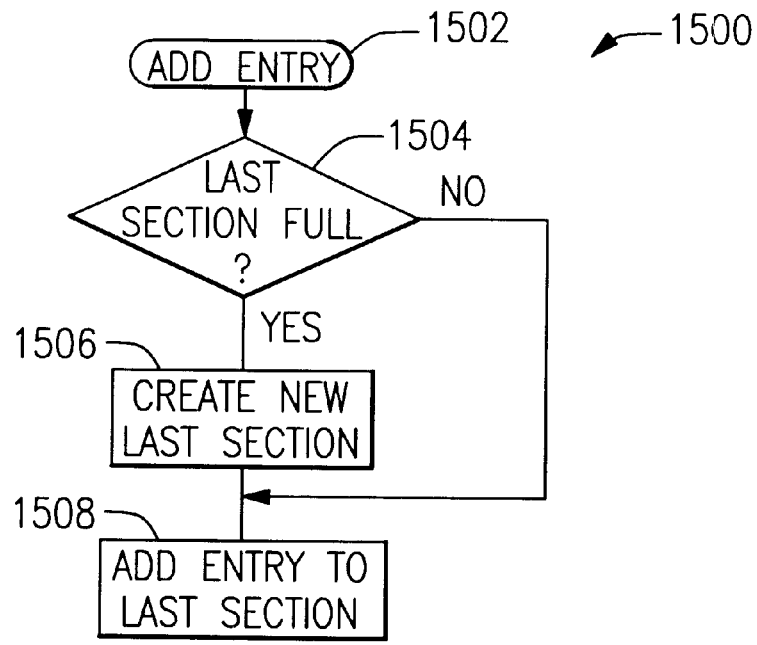
FIG. 15 shows the procedure for adding a queue entry in a first implementation of the present invention.

FIG. 15 shows the procedure 1500 for adding a queue entry 116 in this implementation of the invention. Referring to this figure and to FIG. 3, when a new entry 116 is being added to the queue 104 (step 1502), RSM 102 first determines whether the last queue section 108 (with header HDR3 in FIG. 3) is full—i.e., already contains the maximum permitted number of entries (step 1504). If, as in the FIG. 3 example, the last section 108 is full, RSM 102 creates a new last section 108 (with header New HDR in FIG. 3) and adds the new entry 116 to the newly created last section 108 (step 1508). If at step 1504 the last section 108 is not full, no new section 108 is created and the new entry 116 is added to the previously existing last section 108 (step 1508).

B. Removing Entries

Figure 4:
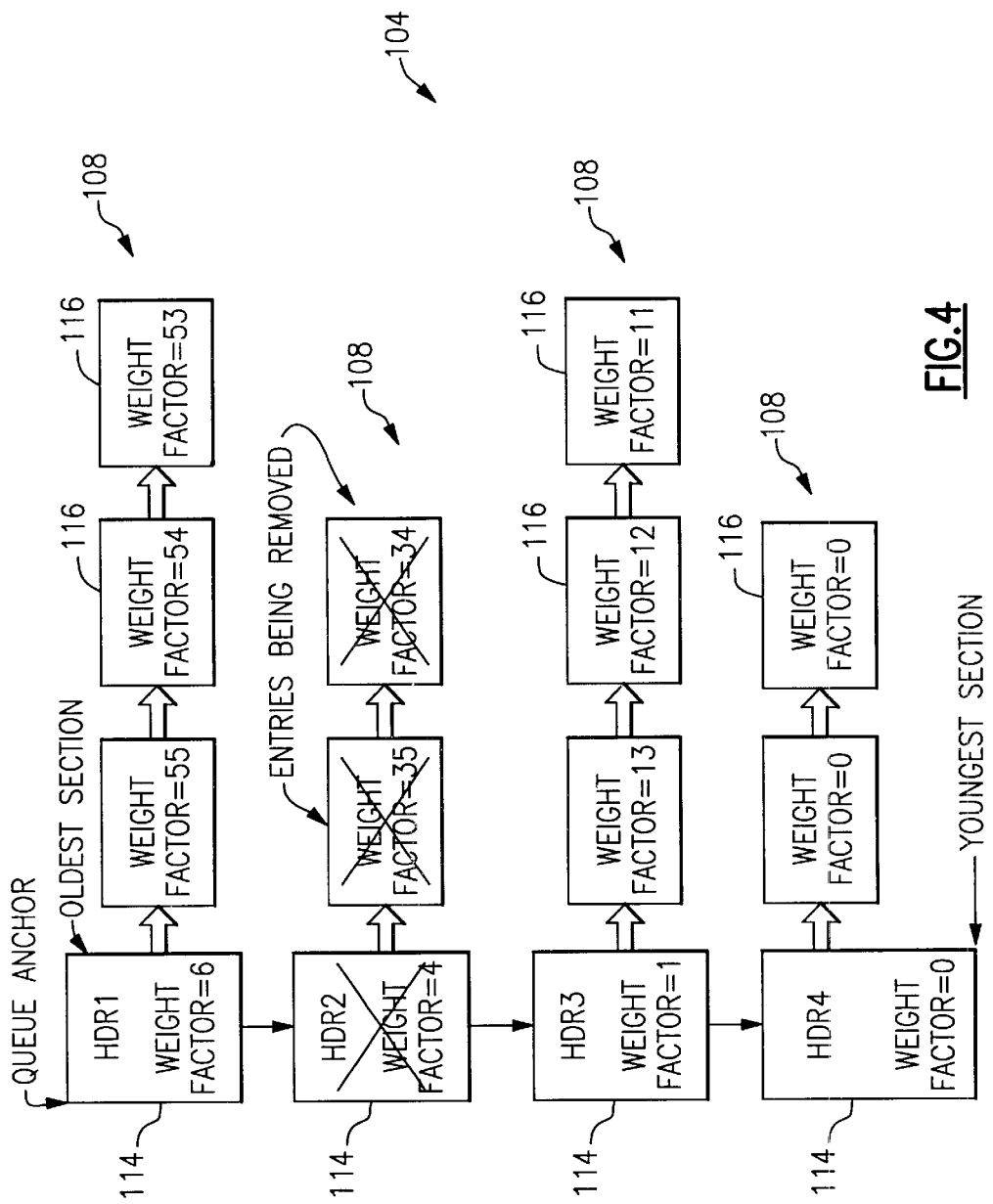
FIG. 4 shows the removal of queue entries in a first implementation of the present invention.

When an existing entry 116 is removed from the queue 104, it is simply removed from its position on the current queue section 108. Again, the remaining queue sections 108 and their entries 116 are not affected. It is possible for consecutive removal requests to be performed before a queue entry balancing process can be initiated. This may result in a section 108 becoming empty, whose header 114 is then removed from the queue 104 and returned to a free header pool (not shown), or the queue sections 108 becoming sparsely populated (FIG. 4).

C. Merging Sections

The main goal of the queue entry balancing process is to eliminate sparsely populated sections 108 and maintain a reasonable number of entries 116 for the remaining sections 108. This can be accomplished by going through each pair of sections 108 of the queue 104, from the youngest section 108 to the oldest section 108, and, if possible, combining the entries 116 of the sections 108 onto a single section 108. The following factors determine whether or not the sections 108 can be combined:

1. The total number of entries 116 on both sections 108 is not more than the maximum allowable number of entries 116.

2. The amount of time it is expected to take to combine the sections 108 cannot exceed the allowable time limit before a system timeout occurs. The time limit varies for different system hardware and in some cases can be controlled by the installation. The total processing time can be calculated based on a typical processing time for a single entry 116 and the number of entries 116 that are involved.

After a pair of sections 108 have been found to have a combined number of entries 116 less than or equal to the maximum allowable, entries 116 from the section 108 with the smaller number of entries 116 are merged to the section 108 with more entries 116. If the section 108 being merged is the higher (i.e., older) of the two sections 108, its entries 116 are moved to the front of the lower section 108. Similarly, if the section 108 being merged is the lower (i.e., newer) section 108, then its entries 116 are moved to the end of the higher section 108.

To maintain the queue integrity in terms of queue entry positions in relation to their weight factor values, so that the entries 116 have the same effective weight factor values as before the merge process is performed, the newly merged entries 116 have their weight factor adjusted accordingly. If entries 116 from a higher section 108 have just been merged to a lower section 108, their weight factor values are increased by an amount that is equal to the difference of the weight factors of the section headers 114. If entries 116 from a lower section 108 have just been merged to an higher section 108, their weight factor values are decreased by an amount that is equal to the difference of the weight factors of the section headers 114.

Figure 5A:
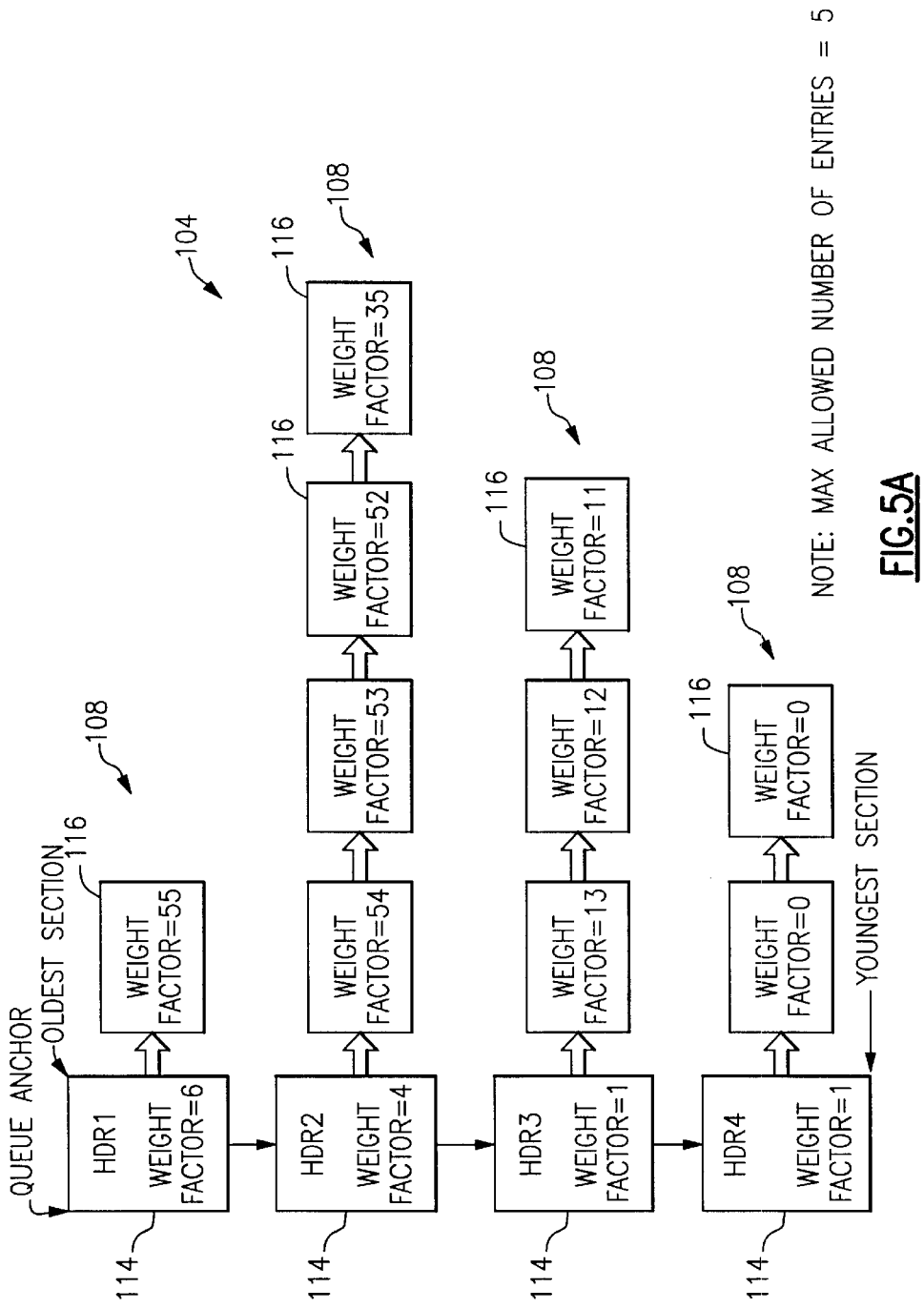
FIGS. 5A, 5B and 5C show the merging of queue sections in a first implementation of the present invention.
Figure 5B:
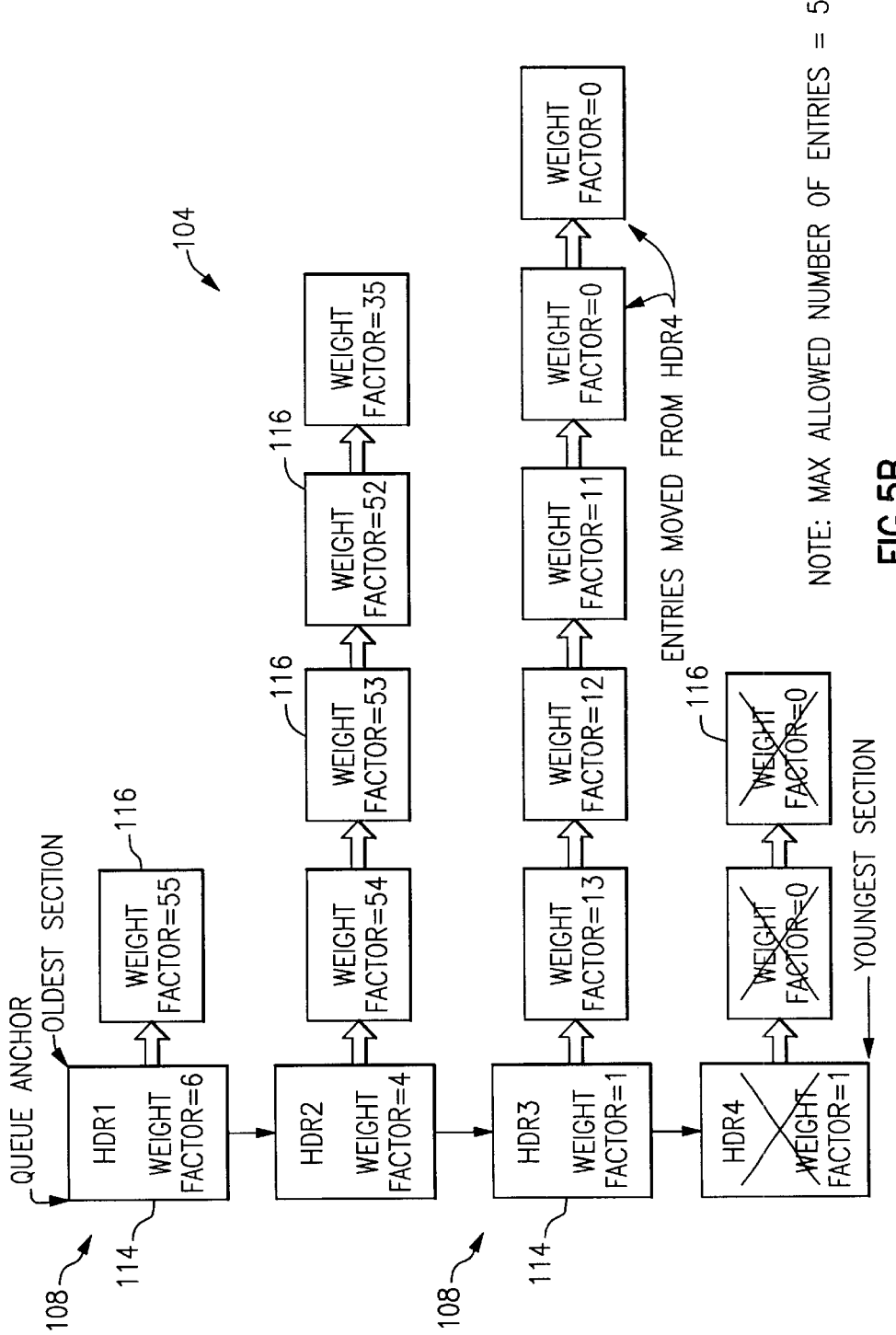
Figure 5C:
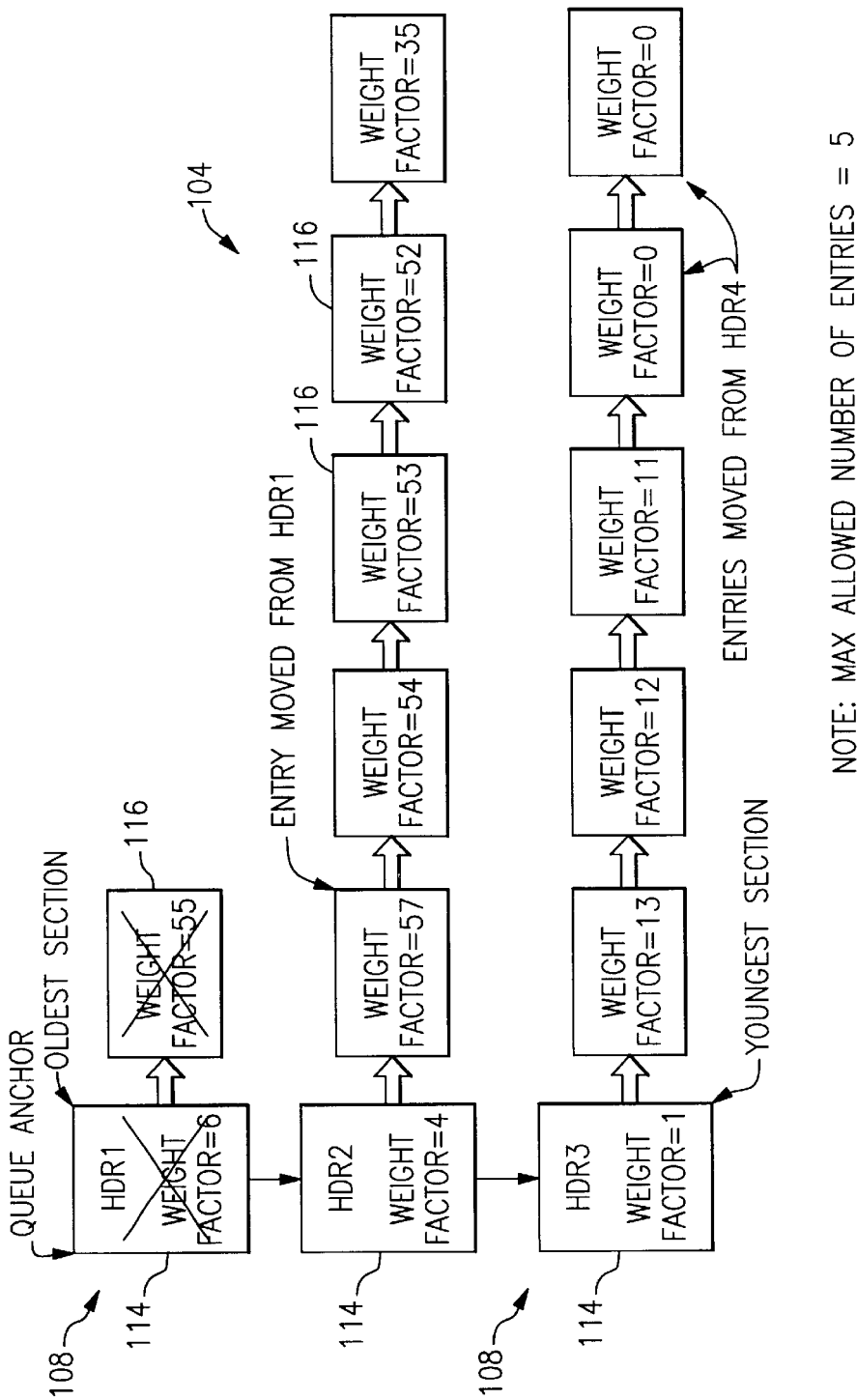

The examination and merging process is repeated for all sections 108 of the queue 104. Each time, the lower section 108 for the new pair is either the higher section 108 of the previous pair of sections 108 that cannot be merged or the new combined section 108 that resulted from a successful previous merge process (FIGS. 5A, 5B and 5C).

2. Second Implementation

A second implementation ensures that a majority of the queue sections 108 are in balance every time a new entry 116 is to be added to the queue 104 or an existing entry 116 is to be removed from the queue 104.

Adding Entries

In this second implementation, when a new entry 116 is added to the queue 104, it is assigned the minimum weight factor value, indicating that it is the newest entry 116 on the queue 104. The position for the newest entry 116 is at the end of the last (i.e., newest) section 108 of the queue 104 (FIG. 6).

Figure 7:
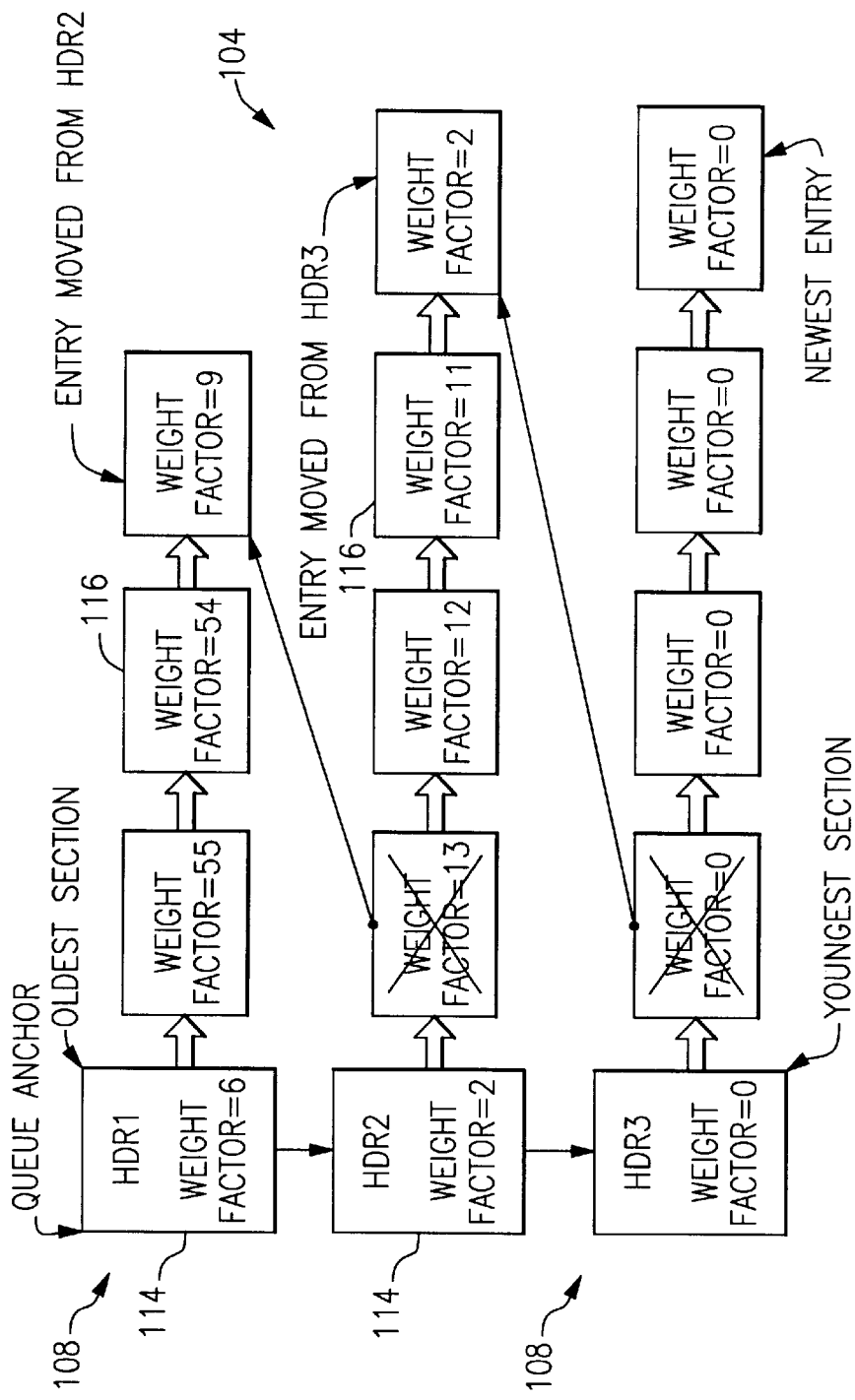

If the last section 108 is already full (based on a predetermined maximum number of entries 116 for each section 108), the oldest entry 116 on the section 108 is moved to the next higher (i.e., older) section 108 to make room on the section 108 for the new entry 116. If the addition of the oldest entry 116 causes the next higher section 108 to exceed the maximum number of entries 116, the oldest entry 116 currently on that section 108 is then moved up to the next higher section 108 of the queue 104 (FIG. 7).

Figure 8:
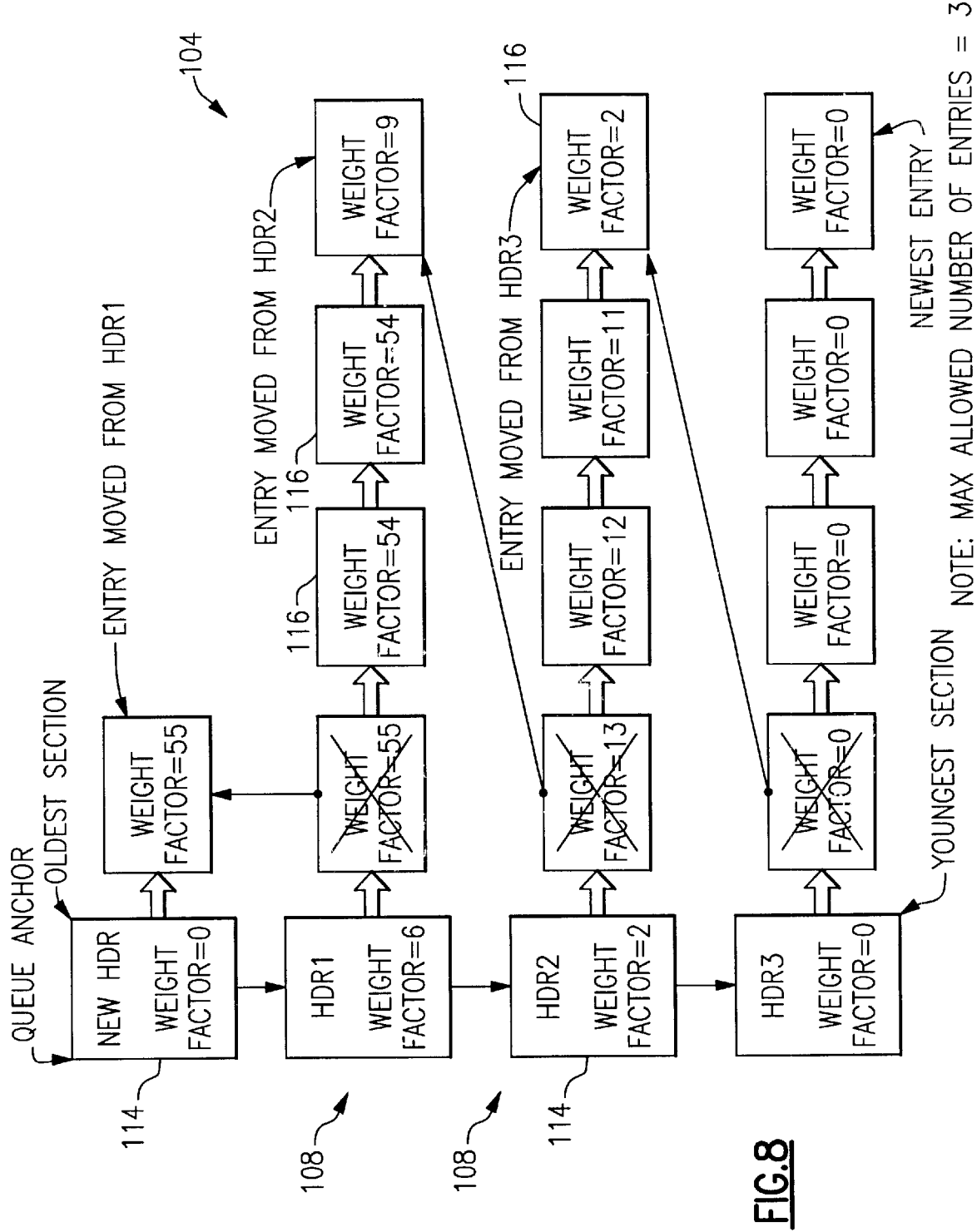

The process is repeated until an available position on a section 108 is found for the displaced entry 116 or the oldest section 108 of the queue 104 has been reached. If the oldest section 108 also currently holds the maximum number of entries 116, a header 114 for a new section 108 is created to accommodate the soon to be displaced entry 116 from the oldest section 108. The new section 108 becomes the first section 108 of the queue 104 (FIG. 8).

Since the queue 104 is presumed to start with one empty section 108, the process of "bubbling up" queue entries 116 guarantees that the queue 104 has adequately populated sections 108 except for the oldest section 108.

Figure 16:
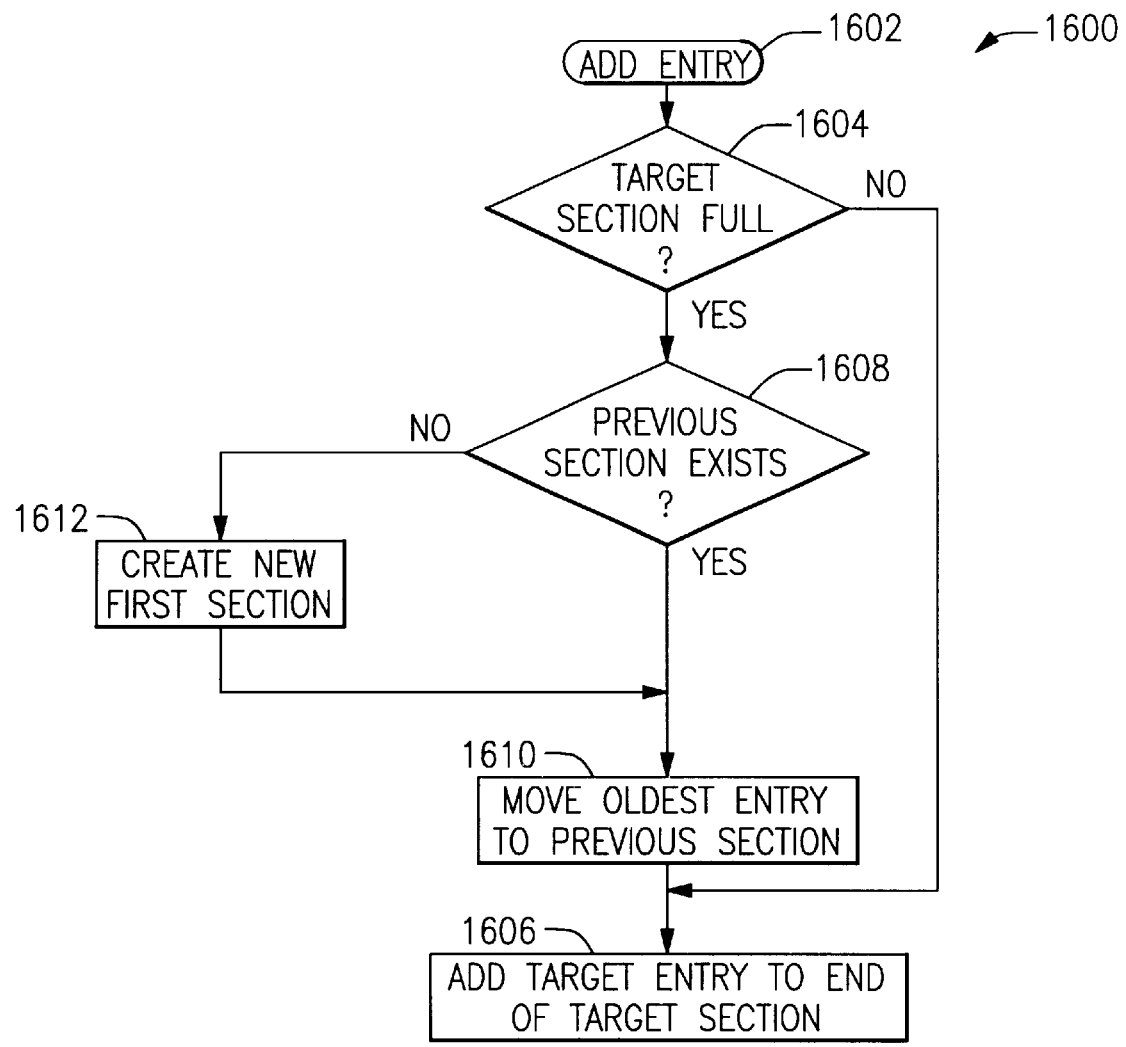
FIG. 16 shows the procedure for adding a queue entry in a second implementation of the present invention.

FIG. 16 shows the procedure 1600 for adding a target entry 116 to a target section in this implementation of the invention. RSM 102 invokes this procedure 1600 to add a new entry 116 to the queue 104, with the new entry 116 as the target entry and the last section 108 as the target section. Referring to this figure and to FIGS. 6–8, when this procedure is invoked (step 1602), RSM 102 first determines whether the target queue section 108 is full (step 1604). If the target section 108 is not full, RSM 102 adds the target entry to the end of the target section (step 1606).

If at step 1604 the target section 108 is not full, RSM 102 determines whether a previous section 108 exists (step 1608). If so, then RSM 102 moves the oldest entry 116 in the target section 108 to the previous section 108 (step 1610)—e.g., by recursively invoking the procedure 1600 with the oldest entry 116 as the new target entry and the previous section 108 as the new target section—and then adds the current target entry 116 to the end of the current target section 108 (step 1606).

If at step 1608 no previous section 108 exists (i.e., the target section 108 is the first section), RSM 102 creates a new first section 108 (step 1612) and moves the oldest entry 116 in the target section 108 to the newly created first section 108 (step 1508) before adding the current target entry 116 to the end of the current target section 116 (step 1606).

Removing Entries

When a random existing entry 116 is dequeued from a queue section 108, the remaining entries 116 on the section 108 are reorganized by shifting entries 116 that were in front of (i.e., older than) the dequeued entry 116 into the place of the dequeued entry 116.

Figure 9:
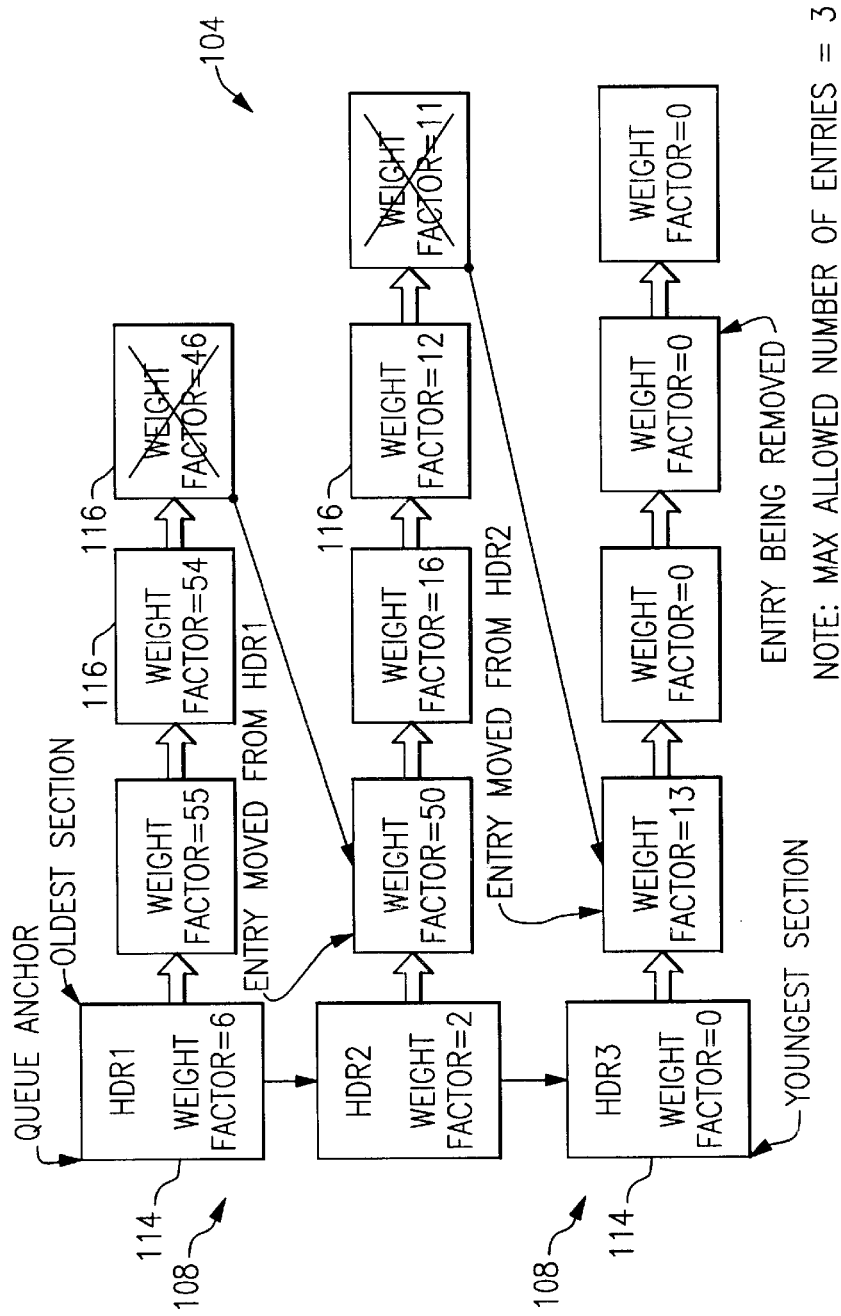
FIGS. 9–10 show the removal of a queue entry in a second implementation of the present invention.

Since the section 108 is expected to contain the maximum number of entries 116 prior to the dequeueing operation, its number of entries 116 is now less than the expected maximum. One or more entries 116 at the end of the next higher section 108 are then moved to the affected section 108, bringing the number of entries 116 on the affected section 108 to the expected maximum entries 116. If the shifting process results in the number of entries 116 on the next higher section 108 falling below the expected maximum number of entries 116, entries 116 on its next higher section 108, if one remains, are shifted to populate the current section 108 (FIG. 9).

Figure 10:
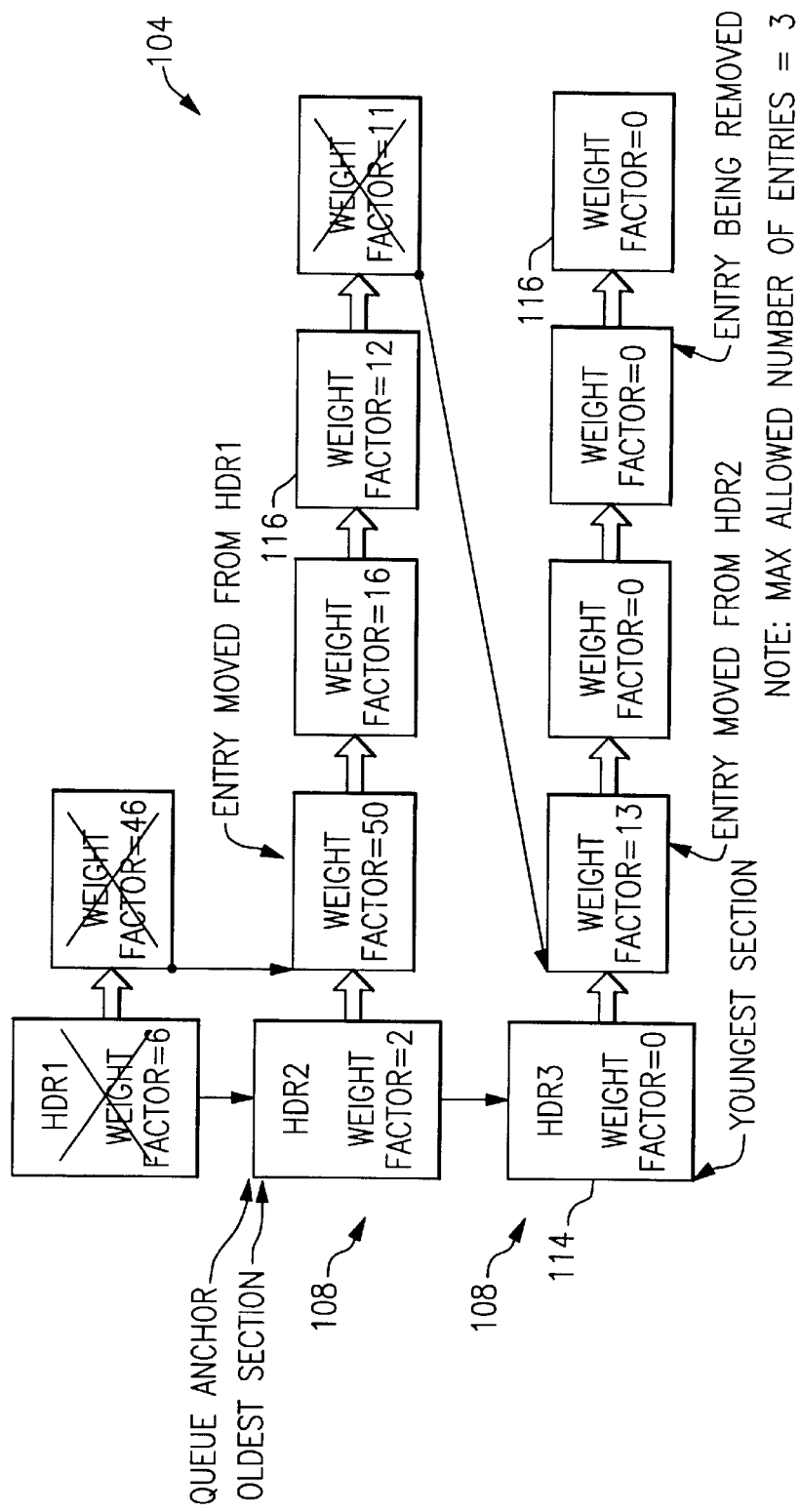

This shifting process is repeated until entries 116 on the oldest section 108 of the queue 104 have been processed. If the oldest section 108 is now empty, its header 114 is dequeued and returned to the free header pool (FIG. 10).

Since most of the queue sections 108 are initially expected to contain the maximum number of entries 116, the shifting process keeps the majority of the queue sections 108 adequately populated after an entry 116 has been removed from the queue 104.

Figure 17:
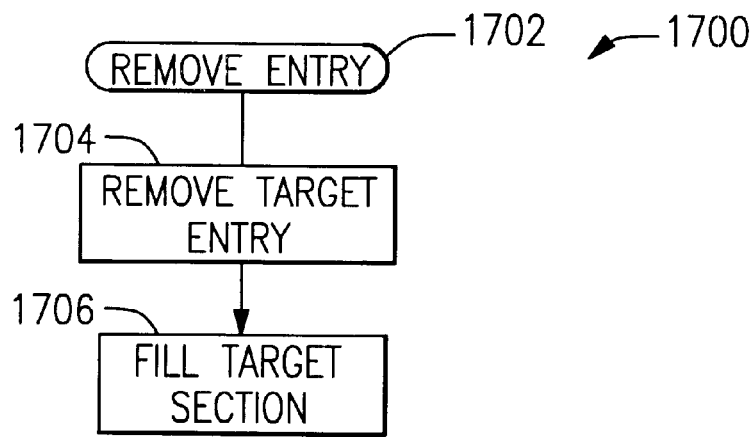
FIG. 17 shows the procedure for removing a queue entry in a second implementation of the present invention.

FIG. 17 shows the procedure 1700 for removing a target entry 116 from a target section 108 of the queue 104 in this implementation of the invention. When this procedure is invoked (step 1702), RSM 102 first removes the target entry 116 from the target section 108 (step 1704), then fills the target section 108 with entries from previous sections 108 (step 1706).

Figure 18:
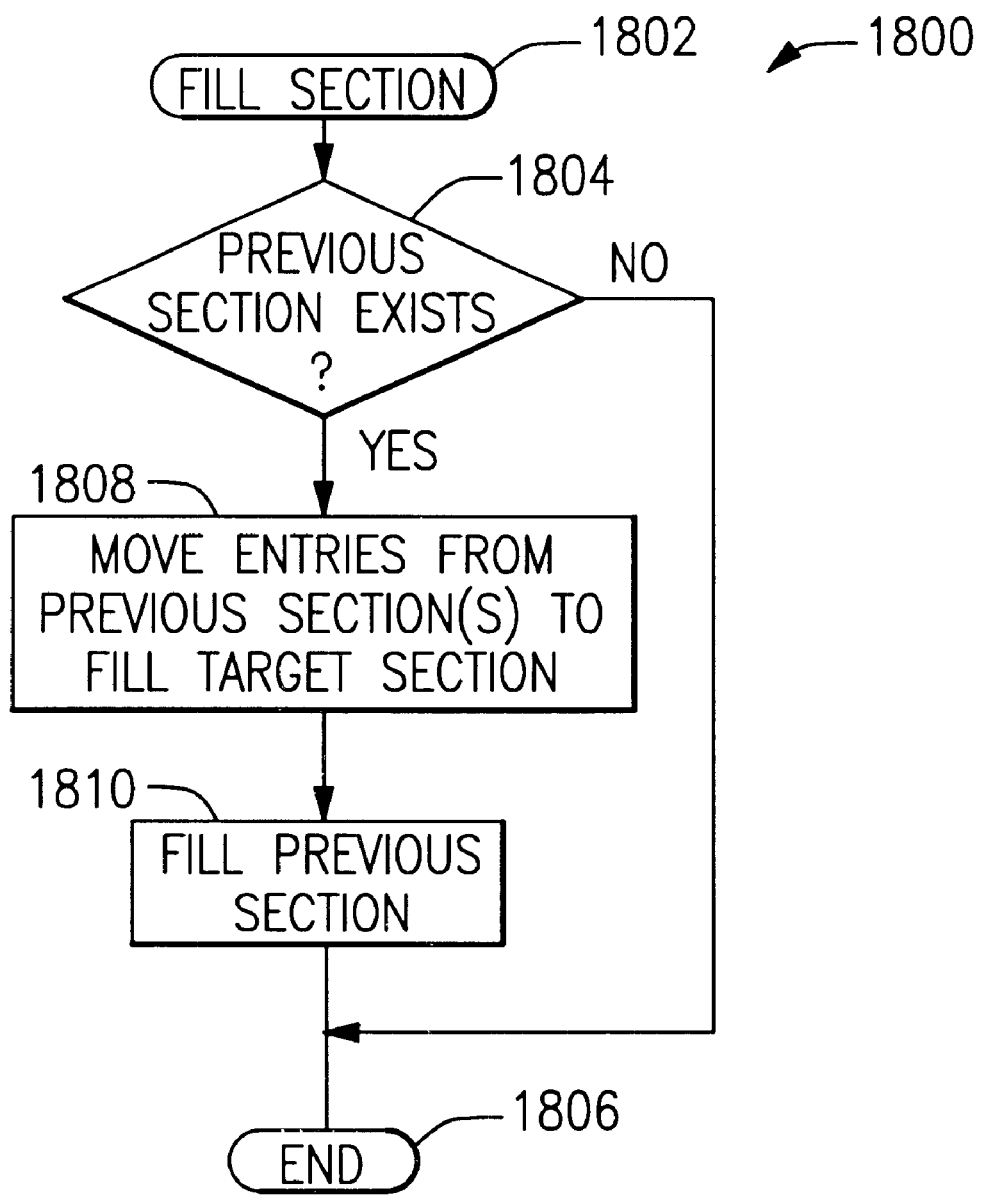
FIG. 18 shows the procedure for filling a queue section in a second implementation of the present invention.

FIG. 18 shows the procedure 1800 for filling the target section 108 with entries from previous sections 108. When the procedure is invoked (step 1802), RSM 102 first determines whether any previous sections 108 exist (step 1804). If not, the procedure terminates (step 1806), since there are no previous sections 108 from which to move entries 116. Otherwise, RSM 102 moves entries 116 from previous sections 108, starting with the last entry 116 on the immediately preceding section 108, until the target section 108 is filled or until there are no more such previous entries (step 1808). RSM 102 then precedes to fill the previous section 108 in a like manner, e.g., by recursively invoking the procedure 1800 with the previous section 108 as a new target section (step 1810).

To maintain effective weight factor values of queue entries 116 that are affected either by an addition or deletion of a queue entry 116, the individual weight factors of the entries 116 are adjusted according to the weight factors of their new sections 108, if such weight factors are being used. If an entry 116 has just been moved to a queue section 108 with higher weight factor than that of its original section 108, the individual weight factor of the entry 116 is decreased by an amount equal to the difference between weight factors of the new section 108 and the entry's original section 108. Conversely, if an entry 116 has just been moved to a queue section 108 with a lower weight factor than that of its original section 108, the weight factor of the entry 116 is increased by an amount equal to the difference between the weight factors of its original section 108 and its new queue section 108.

UPDATE PROCESSING

The effective weight factor for a queue element 116 is the combined value of the weight factor in the section header 114 and the weight factor in the individual entry 116. The update process 120 for the sectioned ordered queue 104 of the present invention can handle processing for larger queues 104 without a dramatic increase in processing time, because some updates are done at the section level rather than by updating individual queue elements 116.

Figure 11:
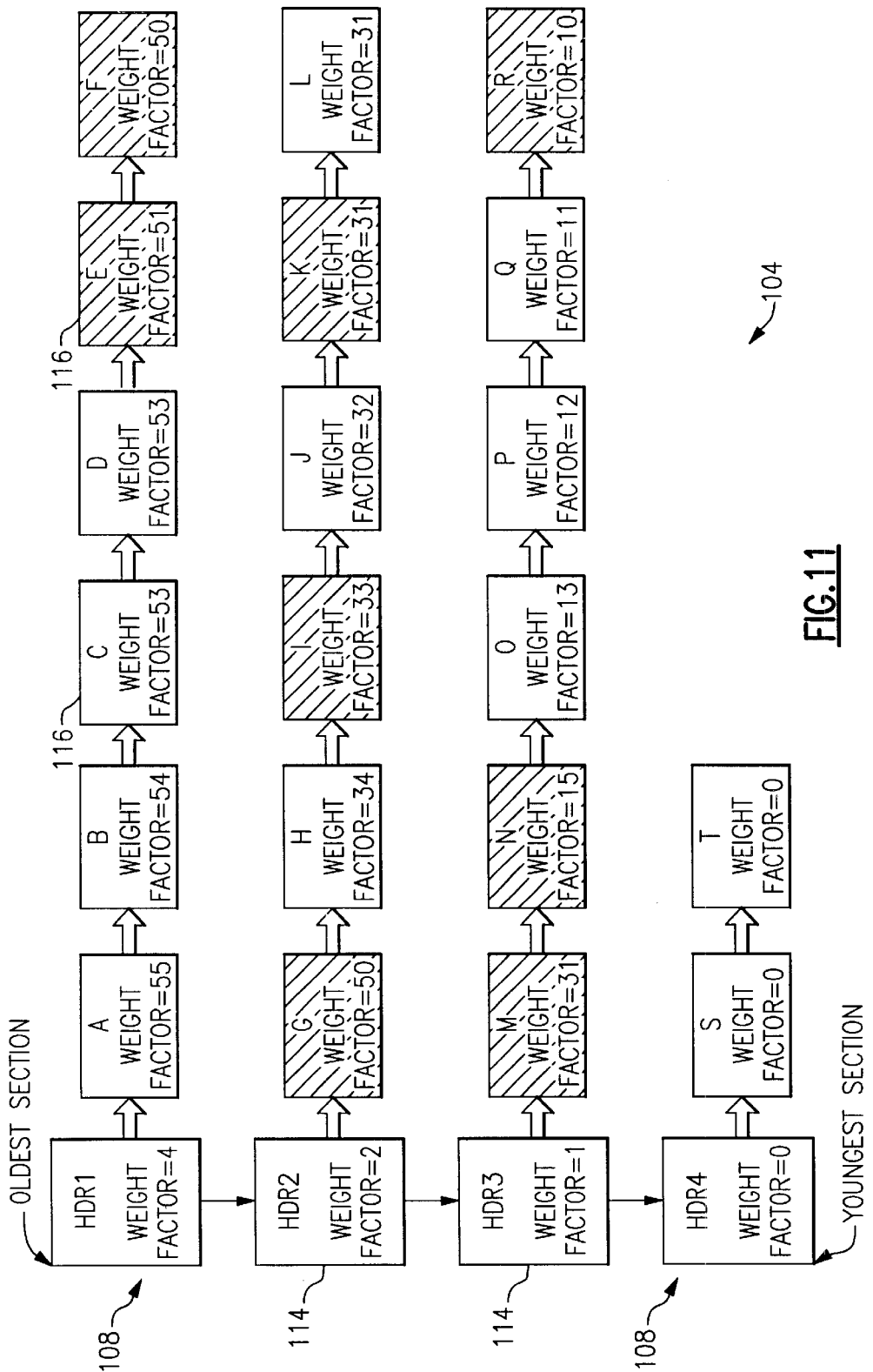
FIG. 11 shows a queue before update processing.
Figure 12:
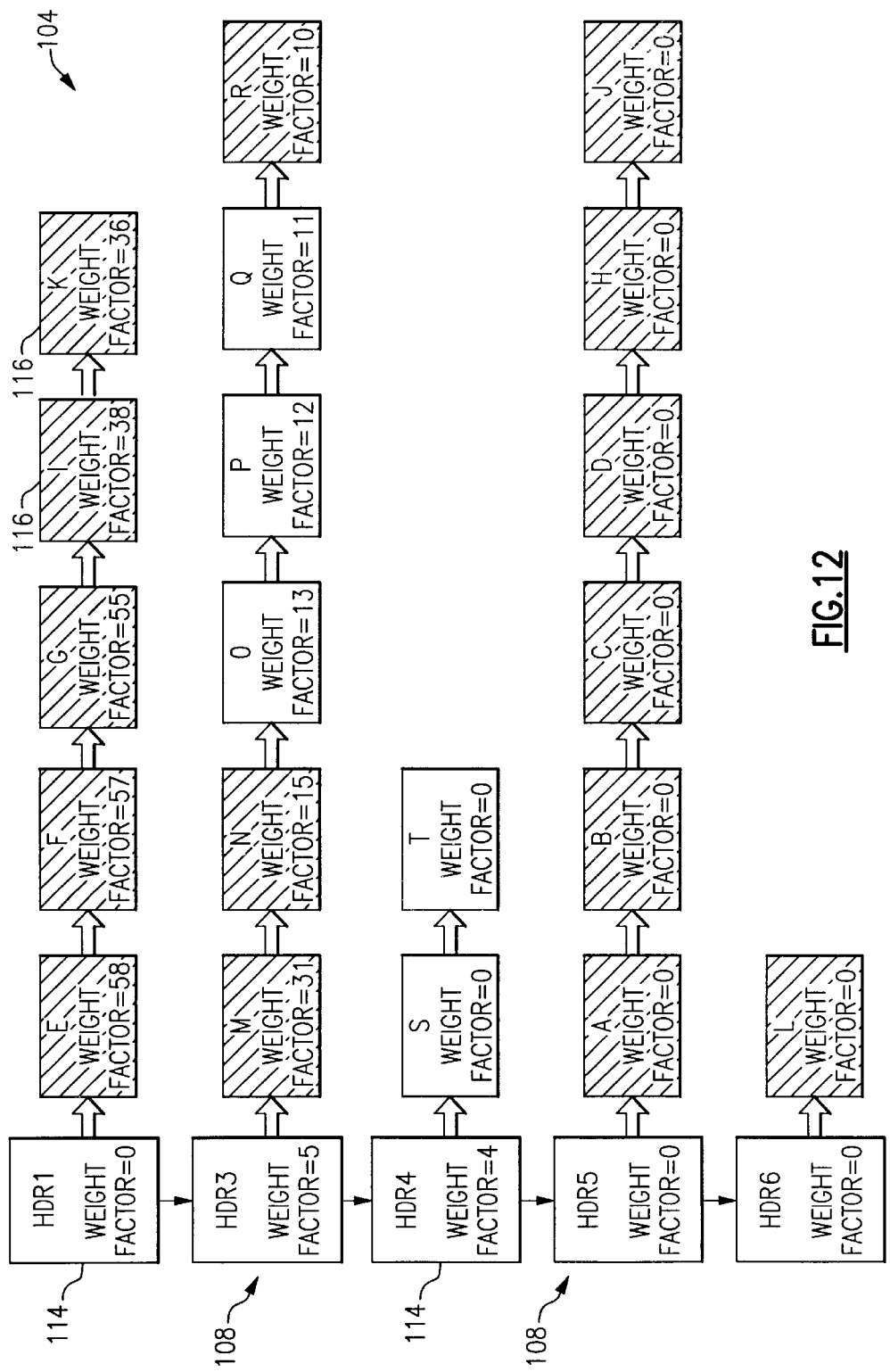
FIG. 12 shows a queue after update processing.

FIGS. 11 and 12 show an example of how the sectioned ordered queue 104 may be manipulated. FIG. 11 shows the queue 104 before the update processing and FIG. 12 shows the queue 104 after the update processing.

Update process 120 ensures that the first section 108 has at least the minimum number of entries 116 after being checked during the update processing. Once the necessary individual elements 116 are processed, the headers 114 for remaining elements 116 are updated with the value to be added to the weight factor. Sections 108 that are processed are processed to completion (i.e., to the last entry 116 in the section) unless the top section 108 has reached the maximum number of elements 116 that meet the criteria for remaining in that section (i.e., having the highest effective weight factors of any elements 116 in the queue 104 and not having recently been referenced).

During update processing, section headers 114 are added and removed as necessary to maintain minimum and maximum number of queue entries 116. Any elements 116 whose weight factors are being reset are placed on a newly created section header 114 with a zero weight factor to ensure that their effective weight factors remain zero.

In the example shown in FIGS. 11 and 12, there are 20 elements 116 on the queue 104. The maximum number of elements 116 per queue section 108 is assumed to be six, and the minimum number of elements 116 is assumed to be three. The update process 120 updates elements 116 corresponding to frames that have not been referenced by a count (UIC) of three. In this example, elements E, F, G, I, K, M, N, and R have not been referenced and are updated by this value; elements A, B, C, D, H, J, L, 0, P, Q, S, and T, on the other hand, have been referenced and therefore have flags set to indicate that they need to have their effective weight factors reset.

FIG. 12 shows the ordered sectioned queue 104 after update processing has been performed. Section headers HDR1 and HDR2 have been processed completely before having at least the minimum number of elements 116 on the top section header 114.

Two new section headers 114 (HDR5 and HDR6) have been created as a place to move the elements 116 (A–D, H, J, and L) whose weight factors are being reset. The weight factor in these new section headers 114 and the individual elements 116 placed on these headers 114 is set to zero. Since the effective weight factors of these elements 116 have been reset, their flags are reset to indicate that this no longer needs to be done.

The elements E–G, I and K that were moved to the top section 108 (with header HDR1) have had their individual weight factors 116 updated to include the weight factor of the originating section header 114, the (unincremented) weight factor of the individual element 116, and the increment value. For instance, entry F has a new effective weight factor of 57 resulting from (4+50+3). Since the effective weight factors in the top section 108 are now expressed entirely in the individual weight factors of the elements 116, the weight factor of the section header 114 has been reset to zero.

Section header HDR2 has been completely processed, and its elements G–L have been moved either to the top header HDR1 or the newly created headers HDR5 and HDR6. Once the section 108 with header HDR2 becomes empty, the section header HDR2 is deleted.

Since at least the minimum number of elements 116 meeting the necessary criteria are now on the top section 108, there is no need to process all of the individual elements 116 on sections HDR3 and HDR4. However the increment value for the weight factor needs to be remembered, therefore the weight factor in the section header 114 is increased. For example header HDR3 was updated from 2 to 5. The effective weight factor for the elements 116 would then also automatically be increased by the increment value. For instance, the new effective weight factor of element N is 20.

It will be noted that the sections 108 with headers HDR3 and HDR4 still contain elements O–Q and S–T that have been referenced and therefore need to have their effective weight factors reset. Their flags remain set, however, so that they will have their effective weight factors reset whenever the update process 120 processes the corresponding portions of their sections 108.

Figure 19:
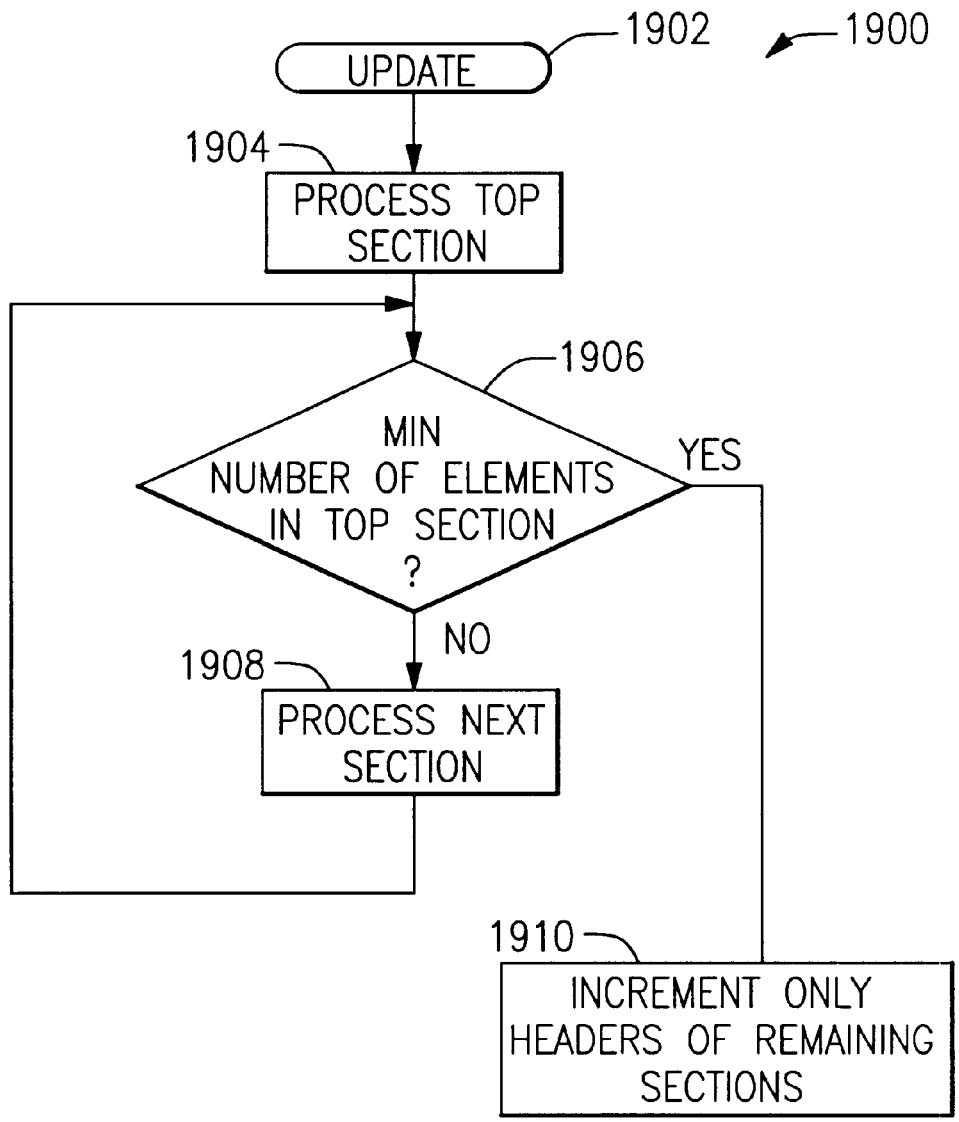
FIG. 19 shows the procedure for update processing.

FIG. 19 shows the procedure 1900 for update processing. This procedure 1900 is invoked periodically, at the end of each reference interval. When the procedure 1900 is invoked (step 1902), RSM 102 completely processes the top section 108 (step 1904), using the procedure 2000 shown in FIG. 20, then determines whether the top section 108 has the minimum number of elements (step 1906). If not, then RSM 102 processes additional sections 108 (step 1908), working downwardly through the queue 104, until the minimum number is obtained. Then, if there are any additional sections 108 remaining, RSM 102 updates just the section headers 114 with the desired increment (in this case three).

Figure 20:
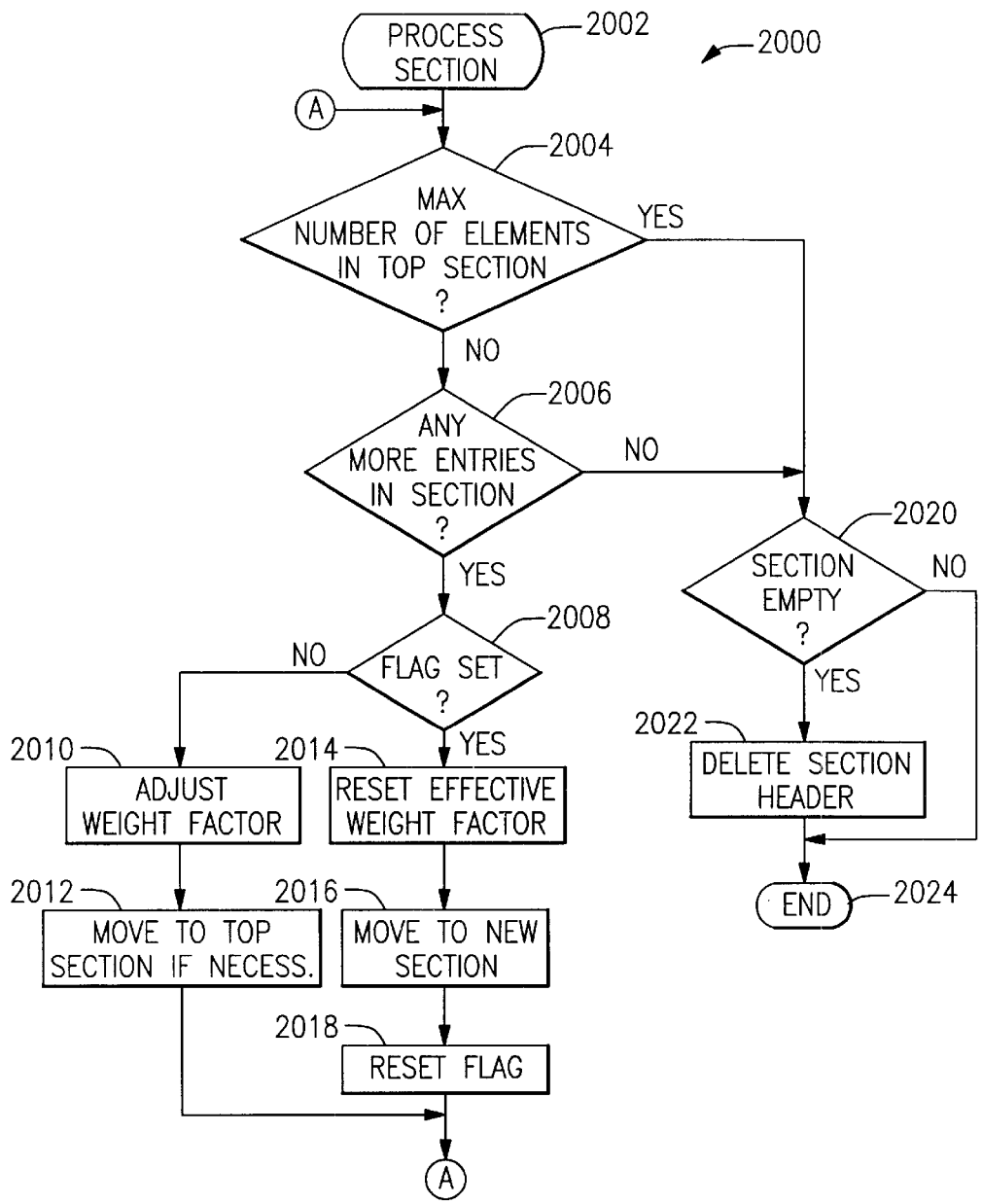
FIG. 20 shows the procedure for processing a particular section during update processing.

FIG. 20 shows the procedure 2000 for processing an individual section 108. Upon being invoked (step 2002), the procedure continues until there are a maximum number of entries 116 in the top section 108 (step 2004) or no more entries 116 in the target section 108 remaining to be processed (step 2006). For each entry 116 that is processed, RSM 102 determines whether the reference flag has been set (step 2008). If not, RSM 102 adjusts its weight factor in the manner described above (step 2010) and moves the entry 116 to the top section 108, if the section being processed is other than the top section (step 2012). If at step 2008 the flag has been set, RSM 102 resets the weight factor of the entry 116 to zero (step 2014), moves the entry to a new section, creating the new section if necessary (step 2016), and resets the flag (step 2018).

When the top section 108 has been filled or when the target section 108 has been completely processed, whichever occurs first, RSM 102 checks to see if the target section 108 is now empty (step 2020). If so, RSM deletes the section header 114 of the target section (step 2022) before terminating (step 2024). Otherwise, RSM 102 terminates section processing without deleting the section header 114.

STEAL PROCESSING

Creating sectioned, ordered queues 104 for the queues of frames backing large virtual areas in system address spaces 106 allows the RSM's frame steal algorithms to successfully steal frames from these queues 104 while still ensuring that a reasonable system performance is achieved. In this implementation, the weight factor for queue elements 116 is the effective UIC value as recorded in both the section header 114 and individual queue elements 116. Relying on (1) the RSM's update process 120 to maintain the sectioned queues 104 such that the beginning section 108 contains frames with the highest weight factors, and (2) on the queue balancing process to ensure that the beginning section 108 is adequately populated, the RSM steal process 122 looks for frames to steal on this first section 108 only. In this way, stealing frames from potentially very long queues 104 can be done without wasting time traversing the whole queue 104, and does not lead to spin loop time-outs, as an enablement check is performed after traversing this one section 108, which is guaranteed to have no more than a specified maximum number of elements 116. Once enabled, other instances of the RSM UIC update and queue balancing processes may run, helping to keep this queue section 108 adequately populated with elements 116 with the highest weight factors. Unlike the RSM UIC update process, the RSM steal process 122 does not continue from where it left off in the chain after an enablement window is reached. The SRM 18 updates its steal request based on the success of the previous steal operation, and steal operations can start from the beginning of an updated set of queues 104.

Although the RSM steal process 122 concentrates on the first section 108, it is cognizant of the structure of the sectioned, ordered queue 104 to help maintain this structure during its frame movement processes. The RSM steal process 122 moves frames that meet the steal criteria to an available frame queue (not shown), after ensuring that the data in the stealable frame is backed in auxiliary storage, and it moves frames that have been recently referenced (and are thus not eligible to be stolen) to the very end of the structured queue 104. Also, in order for the RSM steal process 122 to evaluate and record a frame's weight factor and compare it to the steal criteria set by the SRM 18, it looks at the total weight factor as contained in both the queue element 116 and its associated section header 114.

When an application address space 106 decides it won't be referencing certain virtual storage, it can use a system service to tell the system that it wants to make the associated real storage frames available to the system. These frames are excellent steal candidates. Rather than initiating I/O for each of these frames immediately and overwhelming the auxiliary storage manager, the frames are put at the very beginning of the sectioned, ordered queue 104, with the highest possible weight factor an element 116 can have, to make them prime candidates for stealing. In this way, the system is allowed to defer the I/O until it determines that the frames are needed.

Movement of frames either onto or off of the first section 108 of the sectioned, ordered queue 104 requires that its section header 114 be updated with the new count of frames on this section 108. Also, if this first section 108 becomes empty due to steal processing, the RSM steal process 122 rebuilds the queue structure to point to the next queue section 108 as the new first section 108.

When the RSM steal process 122 moves recently referenced frames to the very end of the structured, ordered queue 104, it builds a new section header 114 at the end of the queue 104 (unless the current youngest section 108 is empty), and queues these frames off of this new, youngest section 108. In this way, the steal process 122 does not need to concern itself with exceeding the maximum allowed numbers of frames on a queue section 108.

Alternatively, the steal process 122 could move referenced frames to the end of the queue 104 by adding them onto the current youngest section 108, provided that addition of the new set of referenced frames would not exceed the maximum allowed for a section 108. This processing would require more elaborate checking, and is not necessary, given that the RSM steal process 122 calls the queue balancing process when it is finished with its queue manipulations.

Figure 13:
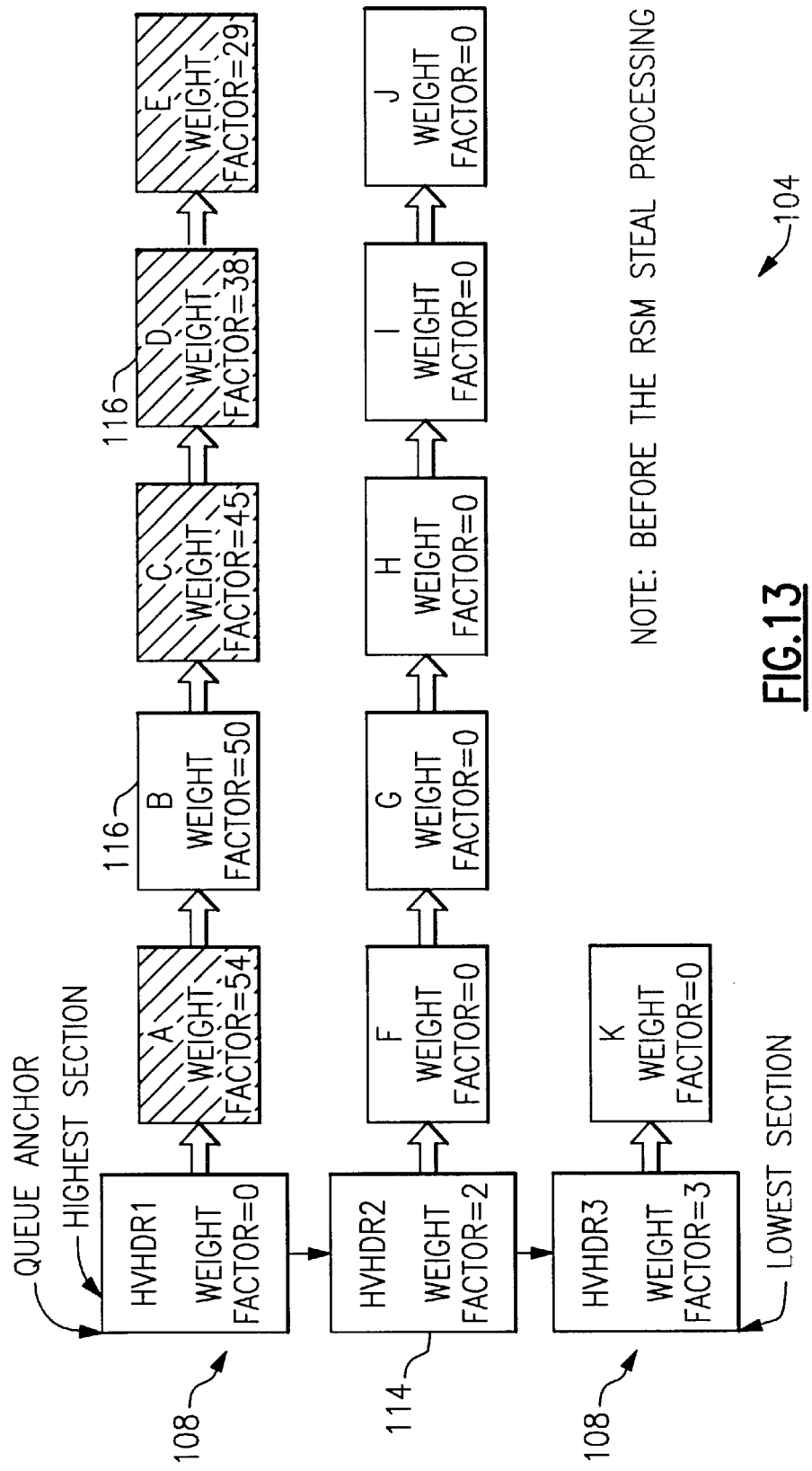
FIG. 13 shows a queue before steal processing.
Figure 14:
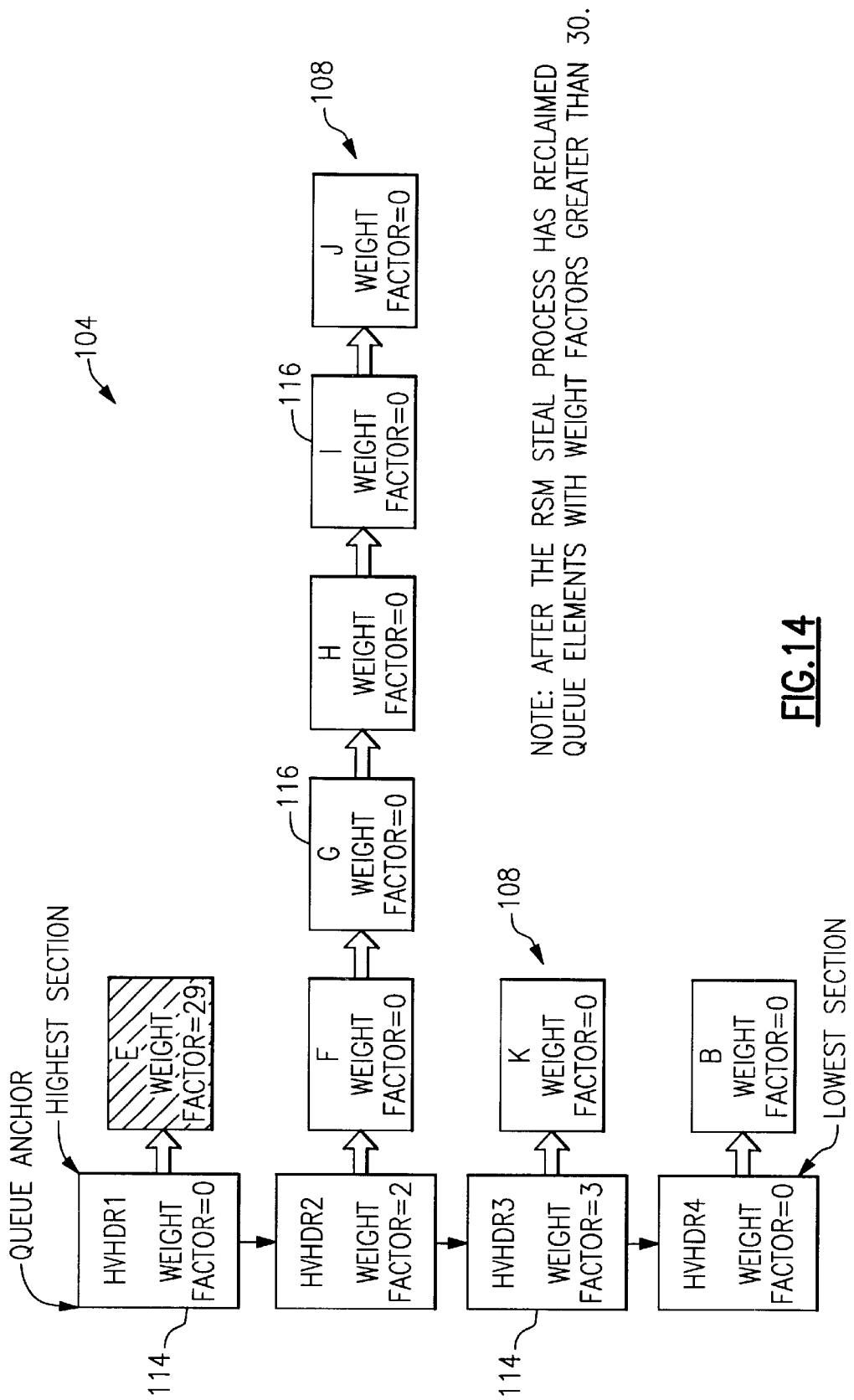
FIG. 14 shows a queue after steal processing.

FIGS. 13 and 14 show a sectioned ordered queue 104 before and after steal processing in which the steal process 122 has reclaimed queue elements with effective weight factors greater than 30. FIG. 13 shows the unprocessed queue 104 with a first section HVHDR1 containing elements A–E, a second section HVHDR2 containing elements F–J, and a third section HVHDR3 containing element K. In section HVHDR1, elements A–D have effective weight factors greater than 30 and are thus eligible for stealing. In sections HVHDR2 and HVHDR3, on the other hand, none of the elements F–J have effective weight factors that would make them eligible for stealing.

FIG. 14 shows the queue 104 after steal processing. Elements A, C and D have been removed from the section HVHDR1 to "steal" the corresponding frames from the queue 104 for address space 106. On the other hand, element B remains in the queue 104, since in the meantime (in this example) the corresponding frame has been referenced, causing the effective weight factor of element B to be reset to zero. To accomplish this, element B is moved from section HVHDR1 to a newly created last section HVHDR4, and its individual weight factor set to zero. (The section weight factors in this particular example are all assumed to be zero.) Only element E, with an ineligible weight factor of 29, remains in the first queue section HVHDR1.

Figure 1:
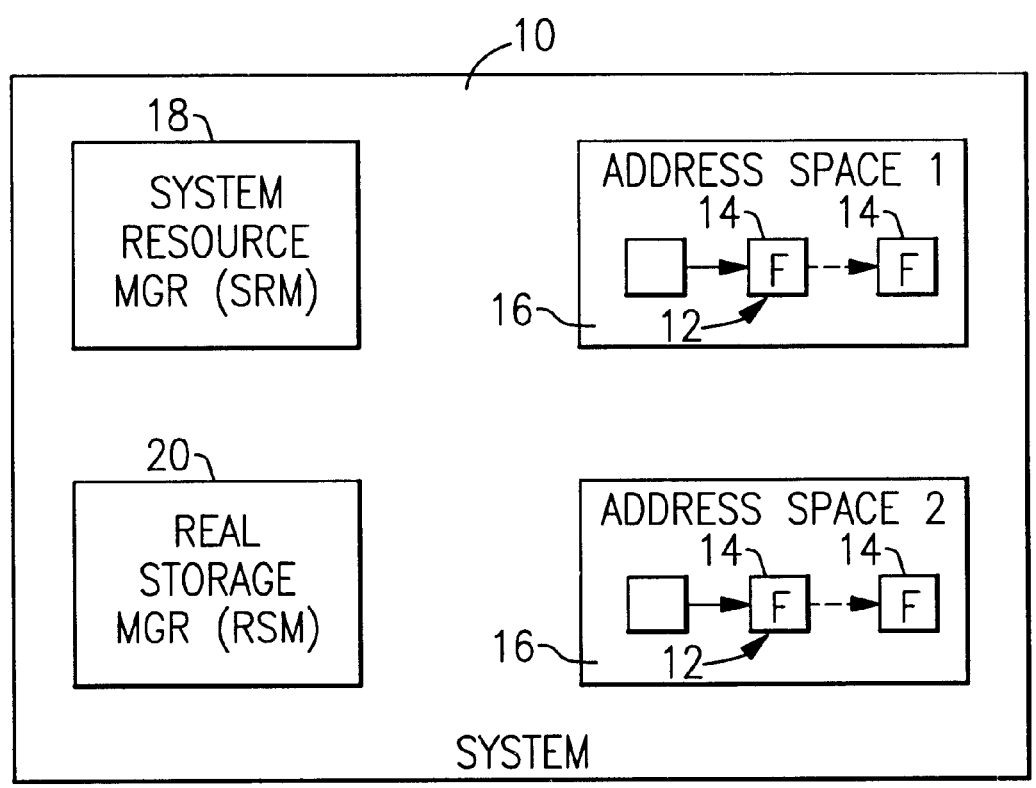
FIG. 1 shows a computer system in which the present invention may be incorporated.
Figure 21:
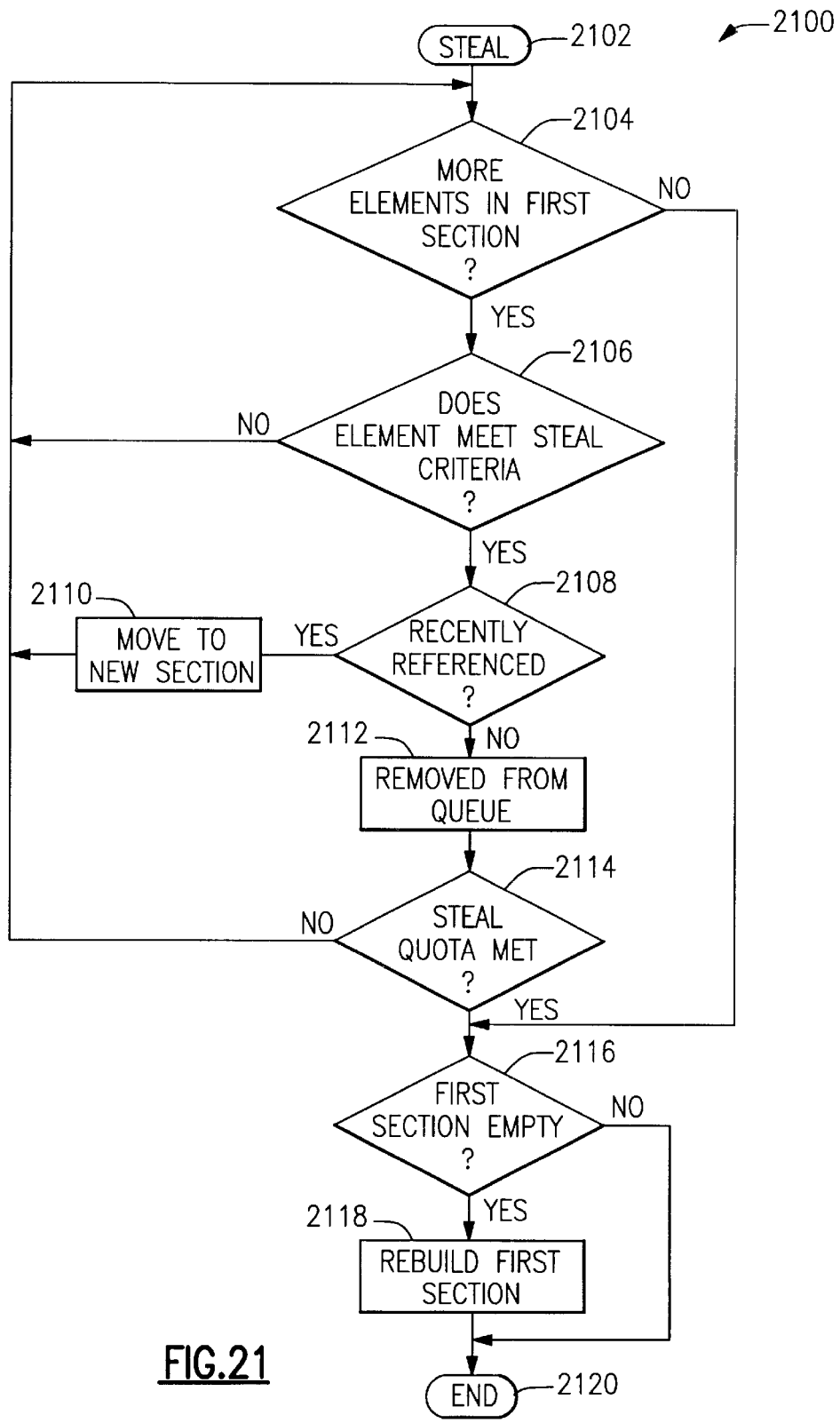
FIG. 21 shows the procedure for steal processing.

FIG. 21 shows the procedure 2100 for steal processing. The procedure 2100 is invoked by RSM 102 for a particular queue 104 in response to receiving a request for additional frames, as from SRM 18 (FIG. 1). Upon being invoked (step 2102), the procedure 2100 continues until there are no more elements 116 in the first section 108 of the queue 104 (step 2104) or until the requisite number of frames is supplied (step 2114), whichever occurs first.

For each element 108 that is processed, RSM 102 first determines whether the effective weight factor of the element meets the steal criteria supplied to the RSM (step 2106). If not, RSM 102 leaves the element 116 in the first section 108 and returns to step 2104. Otherwise, RSM 102 determines whether the flag has been set, indicating that the element 116 has been recently referenced (step 2108). If so, RSM moves the element 116 to a new section (step 2110) and returns to step 2104. If the element 116 has not been recently referenced, then RSM 102 removes the element 116 from the queue 108 and determines whether the requisite number of frames have been supplied (step 2114). If not, RSM 102 returns to step 2104 for another iteration.

When there are no more elements 116 in the first section 108 of the queue 104 (step 2104) or when the requisite number of frames has been supplied (step 2114), RSM 102 checks to see whether the first section 108 is now empty (step 2116). If so, RSM 102 rebuilds the queue 104 to point to the next section 108 as the new first section before terminating (step 2120). Otherwise, the steal process 124 simply terminates.

What is claimed is:

1. A method of maintaining a queue in an information handling system, comprising the steps of:

defining a plurality of queue sections arranged in order from a first queue section to a last queue section, each of said queue sections containing one or more queue entries arranged in order from a first queue entry to a last queue entry;

defining a weight factor for each of said queue sections; and defining a weight factor for each queue entry in each of said queue sections, each of said queue entries having an effective weight factor formed by combining the weight factor defined for the queue section with the weight factor defined for the queue entry.

2. The method of claim 1 in which said queue entries correspond to available storage locations.

3. The method of claim 2 in which said storage locations comprise ranges of real storage addresses.

4. The method of claim 2 in which the effective weight factor for a queue entry represents an amount of time the storage location corresponding to the entry has not been referenced.

5. The method of claim 2, comprising the further step of:

adding a new entry to the last queue section to indicate a newly available corresponding storage location.

6. The method of claim 2, comprising the further step of:

deleting one or more queue entries to indicate that the corresponding storage locations are no longer available.

7. The method of claim 6 in which only queue entries having at least a predetermined effective weight factor are deleted.

8. The method of claim 6 in which only queue entries corresponding to storage locations that have not been referenced in a previous time interval are deleted.

9. The method of claim 6 in which queue entries are deleted only from the first section of said queue.

10. The method of claim 2, comprising the further step of:

updating the effective weight factor of each of said queue entries in accordance with whether the corresponding storage location has been referenced.

11. The method of claim 10 in which said updating step comprises the step of:

maintaining said queue entries in said sections in order of their effective weight factors.

12. The method of claim 10 in which said updating step comprises the steps of:

incrementing the effective weight factors of queue entries corresponding to storage locations that have not been referenced in a previous time interval; and resetting the effective weight factors of queue entries corresponding to storage locations that have been referenced in a previous time interval.

13. The method of claim 12 in which said incrementing step comprises the step of:

incrementing the weight factors of the queue sections containing the queue entries.

14. The method of claim 10 in which said updating step comprises the steps of:

updating the individual weight factor defined for each queue entry in said first queue section in accordance with whether the corresponding storage location has been referenced; and updating only the weight factor defined for each remaining queue section without updating the individual weight factor defined for each queue entry in such remaining queue section.

15. The method of claim 14 in which each queue entry in said first queue section corresponding to a referenced storage location is moved to another section.

16. The method of claim 1, comprising the further step of:

maintaining the number of queue entries in each of said queue sections within a predetermined permissible range defined for said queue sections.

17. The method of claim 1, comprising the further step of:

moving one or more queue entries from a first queue section to a second queue section.

18. The method of claim 17, comprising the further step of:

adjusting the weight factors defined for the moved queue entries so that their effective weight factors in the second queue section are the same as their effective weight factors in the first queue section.

19. The method of claim 1, comprising the further steps of:

creating a new queue section; and moving one or more queue entries from an existing queue section to said new queue section.

20. The method of claim 1, comprising the further steps of:

moving one or more queue entries from a first queue section to one or more other queue sections; and deleting the first queue section.

21. A program storage device readable by a machine, tangibly embodying a program of instructions executable by the machine to perform method steps for maintaining a queue in an information handling system, said method steps comprising:

defining a plurality of queue sections arranged in order from a first queue section to a last queue section, each of said queue sections containing one or more queue entries arranged in order from a first queue entry to a last queue entry;

defining a weight factor for each of said queue sections; and defining a weight factor for each queue entry in each of said queue sections, each of said queue entries having an effective weight factor formed by combining the weight factor defined for the queue section with the weight factor defined for the queue entry.

22. The program storage device of claim 21 in which said queue entries correspond to available storage locations.

23. The program storage device of claim 22, comprising the further step of:

adding a new entry to the last queue section to indicate a newly available corresponding storage location.

24. The program storage device of claim 22, comprising the further step of:

deleting one or more queue entries to indicate that the corresponding storage locations are no longer available.

25. The program storage device of claim 24 in which queue entries are deleted only from the first section of said queue.

26. The program storage device of claim 22, comprising the further step of:

updating the effective weight factor of each of said queue entries in accordance with whether the corresponding storage location has been referenced.

27. The program storage device of claim 22, comprising the further steps of:

updating the individual weight factor defined for each queue entry in said first queue section in accordance with whether the corresponding storage location has been referenced; and updating only the weight factor defined for each remaining queue section without updating the individual weight factor defined for each queue entry in such remaining queue section.

28. The program storage device of claim 27 in which each queue entry in said first queue section corresponding to a referenced storage location is moved to another section.

29. The program storage device of claim 21, comprising the further step of:

maintaining the number of queue entries in each of said queue sections within a predetermined permissible range defined for said queue sections.

30. The program storage device of claim 21, comprising the further step of:

moving one or more queue entries from a first queue section to a second queue section; and adjusting the weight factors defined for the moved queue entries so that their effective weight factors in the second queue section are the same as their effective weight factors in the first queue section.

31. A sectioned ordered queue in an information handling system, comprising a plurality of queue sections arranged in order from a first queue section to a last queue section, each of said queue sections containing one or more queue entries arranged in order from a first queue entry to a last queue entry, each of said queue sections and each queue entry in each of said queue sections having a weight factor defined therefor, each of said queue entries having an effective weight factor formed by combining the weight factor defined for the queue section with the weight factor defined for the queue entry.

32. The queue of claim 31 in which said queue entries correspond to available storage locations.

33. The queue of claim 32 in which a new entry is added to the last queue section to indicate a newly available corresponding storage location.

34. The queue of claim 32 in which one or more queue entries are deleted to indicate that the corresponding storage locations are no longer available.

35. The queue of claim 34 in which queue entries are deleted only from the first section of said queue.

36. The queue of claim 32 in which the effective weight factor of each of said queue entries is updated in accordance with whether the corresponding storage location has been referenced.

37. The queue of claim 32 in which the individual weight factor defined for each queue entry in said first queue section is updated in accordance with whether the corresponding storage location has been referenced and in which only the weight factor defined for each remaining queue section is updated without updating the individual weight factor defined for each queue entry in such remaining queue section.

38. The queue of claim 37 in which each queue entry in said first queue section corresponding to a referenced storage location is moved to another section.

39. The queue of claim 31 in which the number of queue entries in each of said queue sections is maintained within a predetermined permissible range defined for said queue sections.

40. The queue of claim 31 in which one or more queue entries are moved from a first queue section to a second queue section and in which the weight factors defined for the moved queue entries are adjusted so that their effective weight factors in the second queue section are the same as their effective weight factors in the first queue section.

* * * * *